US010035962B2

(12) United States Patent
Podsiadlo et al.

(10) Patent No.: US 10,035,962 B2
(45) Date of Patent: Jul. 31, 2018

(54) TRIM DEWAXING OF DISTILLATE FUEL

(71) Applicant: ExxonMobil Research and Engineering Company, Annandale, NJ (US)

(72) Inventors: Paul Podsiadlo, Easton, PA (US); Stephen J. McCarthy, Center Valley, PA (US); Richard C. Baliban, Houston, TX (US); Amanda K. Miller, Houston, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 26 days.

(21) Appl. No.: 15/281,705

(22) Filed: Sep. 30, 2016

(65) Prior Publication Data

US 2017/0175015 A1 Jun. 22, 2017

Related U.S. Application Data

(60) Provisional application No. 62/270,213, filed on Dec. 21, 2015, provisional application No. 62/270,234, filed on Dec. 21, 2015.

(51) Int. Cl.
| | |
|---|---|
| *C10G 45/02* | (2006.01) |
| *C10G 45/64* | (2006.01) |
| *C10G 47/00* | (2006.01) |
| *C10G 47/18* | (2006.01) |
| *C10G 69/02* | (2006.01) |
| *B01J 29/48* | (2006.01) |
| *B01J 29/44* | (2006.01) |
| *B01J 29/78* | (2006.01) |
| *B01J 29/74* | (2006.01) |

(52) U.S. Cl.
CPC ............. *C10G 69/02* (2013.01); *B01J 29/44* (2013.01); *B01J 29/48* (2013.01); *B01J 29/7461* (2013.01); *B01J 29/7861* (2013.01); *C10G 2300/202* (2013.01); *C10G 2300/70* (2013.01)

(58) Field of Classification Search
CPC ........ C10G 45/02; C10G 45/64; C10G 47/00; C10G 47/18
See application file for complete search history.

(56) References Cited

U.S. PATENT DOCUMENTS

| | | | |
|---|---|---|---|
| 3,354,078 A | 11/1967 | Miele et al. | |
| 4,872,968 A * | 10/1989 | Bowes | C10G 45/64 208/111.3 |
| 8,394,255 B2 | 3/2013 | McCarthy et al. | |
| 2010/0187155 A1 | 7/2010 | McCarthy et al. | |
| 2011/0056869 A1* | 3/2011 | Novak | C10G 45/58 208/49 |
| 2011/0315599 A1* | 12/2011 | Prentice | C10G 45/06 208/66 |
| 2014/0295504 A1 | 10/2014 | Dufresne et al. | |

FOREIGN PATENT DOCUMENTS

| | | |
|---|---|---|
| EP | 0155822 A2 | 9/1985 |
| EP | 1880760 A1 | 1/2008 |
| EP | 2072127 A1 | 6/2009 |
| JP | 2014074091 A | 4/2014 |

OTHER PUBLICATIONS

Weisz et al., "Superactive crystalline alunimosilicate hydrocarbon catalysts", Journal of Catalysis, Aug. 1965, pp. 527-529, vol. 4, iss. 4, Science Direct.
Miale, et al., "Catalysis by crystalline aluminosilicates: IV. Attainable catalytic cracking rate constants, and superactivity", Journal of Catalysis, 1966-10, pp. 278-287, vol. 6, iss. 2, Science Direct.
International Search Report and Written Opinion PCT/US2016/064144 dated Mar. 27, 2017.
International Search Report and Written Opinion PCT/US2016/067423 dated Mar. 27, 2017.
International Search Report and Written Opinion PCT/US2016/067717 dated Mar. 27, 2017.

\* cited by examiner

*Primary Examiner* — Randy Boyer
(74) *Attorney, Agent, or Firm* — Andrew T. Ward

(57) ABSTRACT

Methods and catalysts are provided for performing dewaxing of diesel boiling range fractions, such as trim dewaxing, that allow for production of diesel boiling range fuels with improved cold flow properties at desirable yields. In some aspects, the methods can include use of dewaxing catalysts based on an MEL framework structure (ZSM-11) to provide improved dewaxing activity. In some aspects improved dewaxing is achieved operating at lower pressures and with higher amounts of organic nitrogen slip from hydrotreatment.

18 Claims, 10 Drawing Sheets

TRIM DEWAXING OF DISTILLATE FUEL

CROSS-REFERENCES TO RELATED APPLICATIONS

This application claims priority to U.S. Provisional Application Nos. 62/270,213, filed Dec. 21, 2015 and 62/270,234 filed Dec. 21, 2015, the disclosures of which are incorporated herein by reference in their entirety.

FIELD OF THE INVENTION

Methods for dewaxing distillate boiling range feeds are provided, such as distillate boiling range feeds suitable for fuels production.

BACKGROUND OF THE INVENTION

The requirements for production of diesel boiling range fuels can potentially vary during the course of a year. During summer months, a primary goal of hydroprocessing can be reduction of sulfur and/or nitrogen content of diesel boiling range fuels in order to satisfy regulatory requirements. Sulfur reduction can also be important during winter months, but an additional consideration can be improving the cold flow properties of the diesel boiling range fuels. Dewaxing of diesel boiling range fractions can be used to provide improved cold flow properties, but this can also result in loss of product yield. Methods which can allow for improved production of diesel boiling range fuels while maintaining or improving the yield of such fuels can therefore be desirable.

U.S. Pat. No. 8,394,255 describes methods for integrated hydrocracking and dewaxing of a feed under sour conditions for formation of diesel and lubricant boiling range fractions.

SUMMARY OF THE INVENTION

In an aspect, methods are provided for treating a distillate boiling range feed, comprising: exposing a distillate boiling range feed to a hydrotreating catalyst under effective hydrotreating conditions to form a hydrotreated effluent; and exposing at least a portion of the hydrotreated effluent having an organic nitrogen content of about 10 wppm to about 60 wppm to a dewaxing catalyst under effective dewaxing conditions to form a dewaxed effluent comprising a diesel boiling range product, the dewaxing catalyst comprising one or more hydrogenation metals supported on a bound molecular sieve having a MEL framework structure, the effective dewaxing conditions comprising a $H_2$ pressure of about 800 psig or less.

DETAILED DESCRIPTION OF THE EMBODIMENTS

Overview

Figure 1:
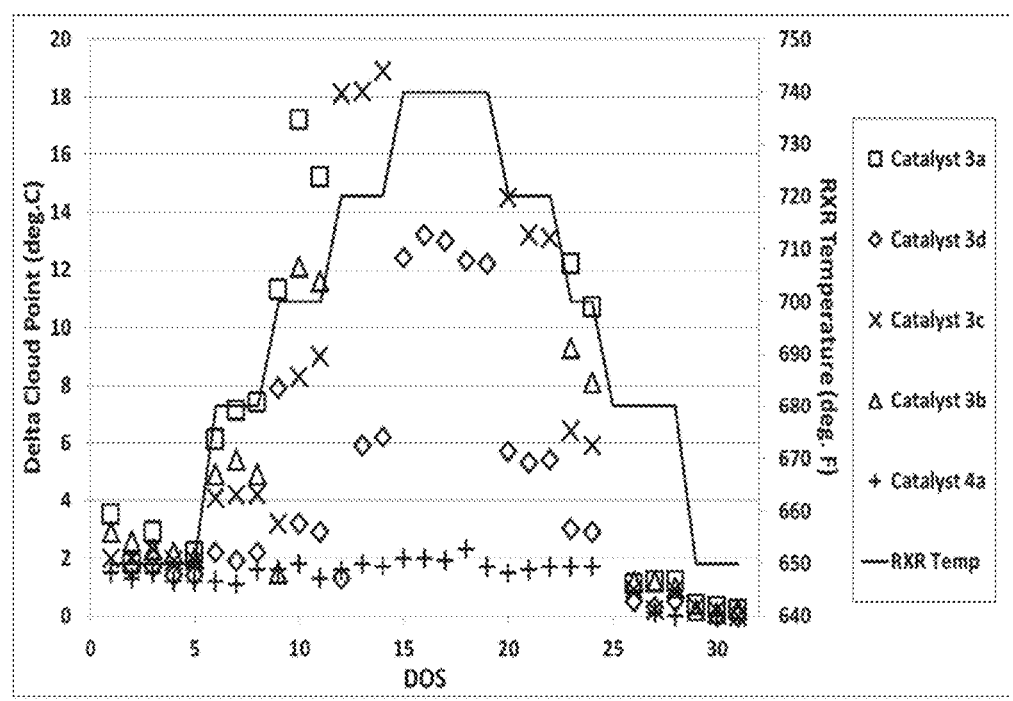
FIG. 1 shows results from processing a distillate feed over dewaxing catalysts with various ratios of molecular sieve to binder.

In various aspects, methods and catalysts are provided for performing dewaxing of diesel boiling range fractions, such as trim dewaxing, that can allow for production of diesel boiling range fuels with improved cold flow properties at desirable yields. In some aspects, the methods can include use of dewaxing catalysts based on an MEL framework structure (ZSM-11) to provide improved dewaxing activity. This can provide sufficient dewaxing activity to achieve a desired level of improvement in cold flow properties at the lower hydrotreating temperatures that can generally be desired near the start of operation of a hydrotreating reactor. In other aspects, the methods can include use of MEL dewaxing catalysts with reduced ratios of molecular sieve to binder, so that trim dewaxing can be provided while maintaining a desirable yield under end-of-run hydrotreating conditions. Additionally or alternately, in some optional aspects, the methods can include use of base metal MEL (ZSM-11) catalysts formed by impregnating the MEL catalysts with a solution including a dispersion agent.

Introducing a dewaxing catalyst into a distillate hydrotreating environment can pose a variety of challenges. Conventional base metal dewaxing catalysts can have a reduced activity for heteroatom removal (e.g., sulfur, nitrogen) and/or poorer distillate selectivity, as compared to a hydrotreating catalyst. As a result, introducing a conventional dewaxing catalyst into an existing hydrotreatment reactor can require selection of less challenging feeds, a reduction in the amount of feed treated and distillate produced, and/or an increase in the required severity of the hydrotreatment reaction conditions. Alternatively, if a noble metal dewaxing catalyst is used as part of the catalyst bed in a hydrotreatment reactor, heteroatom removal can be further reduced and/or dewaxing activity suppression can occur, e.g., due to the presence of $H_2S$ and $NH_3$ formed during hydrotreatment. This can indicate an increase in the reactor temperature to a higher temperature to achieve desired cold flow properties and sulfur levels, leading to shorter run lengths, additional feed conversion, and/or corresponding yield loss. One or more of the above difficulties can be addressed by using dewaxing catalysts based on ZSM-11 for trim dewaxing according to the instant invention.

In various aspects, a catalyst based on ZSM-11 can correspond to a molecular sieve having an MEL framework structure. A molecular sieve having an MEL framework structure composed of silica and alumina can include or be a ZSM-11 zeolite. A catalyst including a molecular sieve having an MEL framework structure that can contain heteroatoms different from silicon and aluminum is also defined herein as a catalyst based on ZSM-11. Heteroatoms that can substitute for silicon and/or aluminum in a MEL framework structure can include, but are not limited to, phosphorus, germanium, gallium, titanium, antimony, tin, zinc, boron, and combinations thereof.

It has been surprisingly found that dewaxing activity is improved for such catalysts at reduced pressure and with higher levels of organic nitrogen exposure. For example, improvements in dewaxing activity may be seen at $H_2$ pressures of about 800 psig or less, for example about 150 psig to 800 psig, or about 250 psig to 800 psig, or about 500 psig to 800 psig, or less than about 750 psig, such as about 150 psig to 750 psig, or about 250 psig to about 750 psig, or about 500 to about 750 psig and when the dewaxing catalyst is exposed to higher organic nitrogen concentrations, such as about 10 wppm to about 100 wppm, or about 10 wppm to about 50 wppm, or about 10 wppm to about 30 wppm, or about 10 wppm to about 20 wppm, or about 20 wppm to about 30 wppm. Advantageously, this nitrogen resistance enables wide-spread application in low pressure diesel hydrotreating units providing additional process flexibility. Nitrogen resistance may also be utilized in higher pressure environments, for example, at pressures greater than 800 psig and up to 3000 psig.

MEL Framework Type (ZSM-11) Dewaxing Catalysts

In various aspects, ZSM-11 catalysts (or more generally MEL framework type dewaxing catalysts) can be used for dewaxing of a feed to form diesel boiling range products. The desired properties of the ZSM-11 catalyst can be selected based on formulation of the catalyst with or without a binder and/or based on selection of hydrogenation metals for the catalyst.

Catalysts can be optionally bound with a binder and/or matrix material prior to use. Binders can be resistant to temperatures for the use desired and are attrition resistant. Binders may be catalytically active or inactive and can include other zeolites, other inorganic materials such as clays, and metal oxides such as alumina, silica, and/or silica-alumina. Clays may include/be kaolin, bentonite, and/or montmorillonite and can typically be commercially available. They may be blended with other materials such as silicates. Other binary porous matrix materials, in addition to silica-aluminas, can include materials such as silica-magnesia, silica-thoria, silica-zirconia, silica-beryllia, and silica-titania. Ternary materials such as silica-alumina-magnesia, silica-alumina-thoria, and silica-alumina-zirconia can additionally or alternatively be suitable for use as binders. The matrix, if present, can be in the form of a co-gel. In some aspects, a ZSM-11 dewaxing catalysts can be formulated using a low surface area binder, where a low surface area binder corresponds to a binder that forms bound catalysts with an external surface area of 300 $m^2/g$ or less, e.g., 250 $m^2/g$ or less, 200 $m^2/g$ or less, 150 $m^2/g$ or less, 100 $m^2/g$ or less, about 80 $m^2/g$ or less, or about 70 $m^2/g$ or less. Optionally, a low surface area binder can include or be an alumina binder.

The amount of MEL framework molecular sieve (zeolite ZSM-11 or other zeolitic molecular sieve) in a catalyst including a binder can be from about 20 wt % zeolite (or zeolitic molecular sieve) to about 100 wt % zeolite relative to the combined weight of binder and zeolite. For example, the amount of zeolite (or other zeolitic molecular sieve) can be about 20 wt % to about 100 wt %, e.g., about 20 wt % to about 90 wt %, about 20 wt % to about 80 wt %, about 20 wt % to about 70 wt %, about 20 wt % to about 60 wt %, about 20 wt % to about 50 wt %, about 20 wt % to about 40 wt %, about 30 wt % to about 100 wt %, about 30 wt % to about 90 wt %, about 30 wt % to about 80 wt %, about 30 wt % to about 70 wt %, about 30 wt % to about 60 wt %, about 30 wt % to about 50 wt %, about 30 wt % to about 40 wt %, about 50 wt % to about 100 wt %, about 50 wt % to about 90 wt %, about 50 wt % to about 80 wt %, about 50 wt % to about 70 wt %, about 60 wt % to about 100 wt %, about 60 wt % to about 90 wt %, about 60 wt % to about 80 wt %, or about 60 wt % to about 70 wt %. It is noted that lower zeolite content in a catalyst can be beneficial at end-of-run hydrotreating temperatures, as the lower zeolite content can mitigate the amount of additional feed conversion that can occur at higher temperatures.

After combining ZSM-11 (or other MEL framework structure molecular sieve) with any optional binder, the combined molecular sieve with or without binder can be extruded to form catalyst or support particles. Alternatively, catalyst particles may be formed by any other convenient method. After forming catalyst particles, catalytically active (hydrogenation) metals can be added to the catalyst particles by any convenient method, such as by impregnation. Catalytically active metals can additionally or alternatively be added during the mulling and extrusion process.

For catalysts including base metals, the hydrogenation metals can generally correspond to metals from Groups 6-12 of the Periodic Table based on the IUPAC system having Groups 1-18, for example from Groups 6 and 8-10. Examples of such metals can include Ni, Mo, Co, W, Mn, Cu, and/or Zn. Mixtures of hydrogenation metals may be used, such as Co/Mo, Ni/Mo, or Ni/W. The amount of hydrogenation metal or metals (typically present as metal oxides) on the catalyst may range from about 1.0 wt % to about 30 wt %, based on weight of the catalyst precursor. For example, the amount of hydrogenation metals can be about 1.0 wt % to about 30 wt %, e.g., about 1.0 wt % to about 25 wt %, about 1.0 wt % to about 20 wt %, about 1.0 wt % to about 15 wt %, about 1.0 wt % to about 12 wt %, about 3.0 wt % to about 30 wt %, about 3.0 wt % to about 25 wt %, about 3.0 wt % to about 20 wt %, about 3.0 wt % to about 15 wt %, about 3.0 wt % to about 12 wt %, about 5.0 wt % to about 30 wt %, about 5.0 wt % to about 25 wt %, about 5.0 wt % to about 20 wt %, about 5.0 wt % to about 15 wt %, about 5.0 wt % to about 12 wt %, about 10 wt % to about 30 wt %, about 10 wt % to about 25 wt %, about 10 wt % to about 20 wt %, or about 10 wt % to about 15 wt %.

For catalysts including noble metals, the hydrogenation metal can be any Group 8-10 noble metal. Optionally but preferably in such embodiments, the Group 8-10 noble metal can include or be Pt and/or Pd. The amount of Group 8-10 noble metal can be about 0.1 wt % to about 5.0 wt % based on catalyst weight, e.g., about 0.1 wt % to about 2.5 wt %, about 0.1 wt % to about 2.0 wt %, about 0.1 wt % to about 1.8 wt %, about 0.1 wt % to about 1.5 wt %, about 0.1 wt % to about 1.2 wt %, about 0.1 wt % to about 1.0 wt %, about 0.2 wt % to about 5.0 wt %, about 0.2 wt % to about 2.5 wt %, about 0.2 wt % to about 2.0 wt %, about 0.2 wt % to about 1.8 wt %, about 0.2 wt % to about 1.5 wt %, about 0.2 wt % to about 1.2 wt %, about 0.2 wt % to about 1.0 wt %, about 0.3 wt % to about 5.0 wt %, about 0.3 wt % to about 2.5 wt %, about 0.3 wt % to about 2.0 wt %, about 0.3 wt % to about 1.8 wt %, about 0.3 wt % to about 1.5 wt %, about 0.3 wt % to about 1.2 wt %, about 0.3 wt % to about 1.0 wt %, about 0.5 wt % to about 5.0 wt %, about 0.5 wt % to about 2.5 wt %, about 0.5 wt % to about 2.0 wt %, about 0.5 wt % to about 1.8 wt %, about 0.5 wt % to about 1.5 wt %, about 0.5 wt % to about 1.2 wt %, or about 0.5 wt % to about 1.0 wt %.

In some aspects, hydrogenation metals can be added to the catalyst particles by impregnation. Optionally, when the catalyst particles are impregnated with a base metal salt, the catalyst particles can be impregnated using a solution that can also include a dispersion agent/aid.

Impregnation, such as impregnation by incipient wetness and/or ion exchange in solution, can be a commonly used technique for introducing metals into a catalyst that includes a support. During impregnation, a support is typically exposed to a solution containing a salt of the metal for impregnation. There are many variables that can affect the dispersion of the metal salt during impregnation, including the concentration of the salt, the pH of the salt solution, the point of zero charge of the support material, but not excluding other variables that may also be important, e.g., during incipient wetness and/or ion exchange impregnation. Multiple exposure steps can optionally be performed to achieve a desired metals loading on a catalyst. After impregnating a support with an aqueous metal salt, the support can be dried to remove excess water. The drying can be performed under any convenient atmosphere, such as air, at a temperature from about 80° C. to about 200° C. Optionally but preferably, when a dispersing agent/aid is included in the impregnation solution, the catalyst particles can remain uncalcined prior to sulfidation. Otherwise, the catalyst particles can be calcined at a temperature of about 250° C. to about 550° C. after impregnation.

In addition to water soluble metal salts, the impregnation solution may include one or more dispersion agents/aids. A dispersion agent/aid can include or be an organic compound comprising 2 to 10 carbons and can have a ratio of carbon atoms to oxygen atoms of about 2 to about 0.6. Optionally, the dispersion agent/aid can include or be a carboxylic acid. Examples of suitable dispersion agents/aids can include glycols (e.g., ethylene glycol) and carboxylic acids, such as citric acid and gluconic acid. Optionally, the dispersion agent/aid can include/be an amine or other nitrogen-containing compound, such as nitrilotriacetic acid. Without being bound by any particular theory, it is believed that the dispersion agent/aid can be removed from the catalyst during the heating and/or calcination steps performed after impregnation to form metal oxides from the metal salts.

The amount of dispersion agent/aid in the impregnation solution can be selected based on the amount of metal in the solution. In some aspects, the molar ratio of dispersion agent/aid to total metals in the solution can be about 0.1 to about 5.0, e.g., about 0.1 to about 2.0, about 0.1 to about 1.0, about 0.2 to about 5.0, about 0.2 to about 2.0, about 0.2 to about 1.0, about 0.3 to about 5.0, about 0.3 to about 2.0, about 0.3 to about 1.0, about 0.4 to about 5.0, about 0.4 to about 2.0, or about 0.4 to about 1.0. Additionally or alternately, for aspects where a non-noble Group VIII metal is present in the impregnation solution, the molar ratio of dispersion agent/aid to non-noble Group VIII metal can be about 0.5 to about 10, e.g., about 0.5 to about 5.0, about 0.5 to about 3.0, about 1.0 to about 10, about 1.0 to about 5.0, or about 1.0 to about 3.0.

After forming a catalyst with supported base metals, the base metals may be sulfided prior to use to form a sulfided base metal catalyst. The sulfidation of the metals can be performed by any convenient method, such as gas phase sulfidation and/or liquid phase sulfidation. Sulfidation can generally be carried out by contacting a catalyst including metal oxides with a sulfur containing compound, such as elemental sulfur, hydrogen sulfide, and/or a polysulfide. Hydrogen sulfide can be a convenient sulfidation agent for gas phase sulfidation, and can be incorporated into a gas phase sulfidation atmosphere containing hydrogen in an amount of about 0.1 wt % to 10 wt %. Sulfidation can additionally or alternatively be carried out in the liquid phase utilizing a combination of a polysulfide, such as a dimethyl disulfide spiked hydrocarbon stream, and hydrogen. The sulfidation can be performed at any convenient sulfidation temperature, such as from 150° C. to 500° C. The sulfidation can be performed at a convenient sulfidation pressure, such as from 100 psig to 1000 psig or more. The sulfidation time can vary depending on the sulfidation conditions, such that sulfidation times of 1 hour to 72 hours can often be suitable. The catalyst may be further steamed prior to use, if desired.

Processing Using ZSM-11 Dewaxing Catalyst—Feedstock

A ZSM-11 dewaxing catalyst and/or other MEL framework structure dewaxing catalyst can be used for dewaxing of various feeds, such as diesel boiling range feeds and/or distillate boiling range feeds. One way of defining a feedstock can be based on the boiling range of the feed. One option for defining a boiling range can be to use an initial boiling point for a feed and/or a final boiling point for a feed. Another option, which in some instances may provide a more representative description of a feed, can be to characterize a feed based on the amount of the feed that boils at one or more temperatures. For example, a "T5" boiling point for a feed represents the temperature at which 5 wt % of the feed boils off. Similarly, a "T95" boiling point represents the temperature at 95 wt % of the feed boils. A suitable ASTM method can be used for characterization of boiling points (including fractional boiling points), such as ASTM D86 or ASTM 2887, inter alia.

As defined herein, a diesel boiling range feed or fraction can having a boiling range based on a T5 boiling point and/or a T10 boiling point, and a T95 boiling point and/or a T90 boiling point. In various aspects, a diesel boiling range feed or fraction can be defined as a feed or fraction with a T5 boiling point of at least 177° C. and a T95 boiling point of 371° C. or less, e.g., a T5 boiling point of at least 177° C. and a T90 boiling point of 371° C. or less, a T10 boiling point of at least 177° C. and a T95 boiling point of 371° C. or less, or a T10 boiling point of at least 177° C. and a T90 boiling point of 371° C. or less. As defined herein, a lubricant boiling range feed or fraction can having a boiling range based on a T5 boiling point and/or a T10 boiling point, and a T95 boiling point and/or a T90 boiling point. In various aspects, a lubricant boiling range feed or fraction can be defined as a feed or fraction with a T5 boiling point of at least 371° C. and a T95 boiling point of 510° C. or less, e.g., a T5 boiling point of at least 371° C. and a T90 boiling point of 510° C. or less, a T10 boiling point of at least 371° C. and a T95 boiling point of 510° C. or less, or a T10 boiling point of at least 371° C. and a T90 boiling point of 510° C. or less. As defined herein, a distillate boiling range can be defined that represents a combination of the diesel and lubricant boiling ranges. Thus, a distillate boiling range feed or fraction can be defined as a feed or fraction with a T5 boiling point of at least 177° C. and a T95 boiling point of 510° C.

or less, e.g., a T5 boiling point of at least 177° C. and a T90 boiling point of 510° C. or less, a T10 boiling point of at least 177° C. and a T95 boiling point of 510° C. or less, or a T10 boiling point of at least 177° C. and a T90 boiling point of 510° C. or less.

A wide range of petroleum and chemical feedstocks can be hydroprocessed in reaction systems including a dewaxing catalyst. Suitable feedstocks can include whole/reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

In embodiments involving an initial sulfur removal stage prior to hydrocracking or dewaxing, the sulfur content of the feed can be at least 300 ppm by weight of sulfur, e.g., at least 500 wppm, at least 1000 wppm, at least 2000 wppm, at least 4000 wppm, at least 7000 wppm, at least 10000 wppm, or at least 20000 wppm. In other embodiments, including some embodiments where a previously hydrotreated and/or hydrocracked feed is used, the sulfur content can be 2000 wppm or less, e.g., 1000 wppm or less, 500 wppm or less, 300 wppm or less, or 100 wppm or less.

In some aspects, a ZSM-11 and/or other MEL framework structure dewaxing catalyst can be used to provide an improved amount of cloud point reduction when exposed to a diesel and/or lubricant boiling range feed under effective dewaxing conditions and/or effective hydrotreating conditions. Effective conditions for catalytic dewaxing and hydrotreating are described in greater detail below. Optionally, additional benefit in maintaining desirable yield while achieving a trim dewaxing level of cloud point improvement (e.g., about 3° C. to about 5° C.) can be obtained by performing dewaxing and/or hydrotreatment at reduced temperatures, such as about 370° C. or less, about 360° C. or less, about 350° C. or less, or about 340° C. or less. In combination with typical start-of-run temperatures, the additional benefit in cloud point reduction can be achieved for hydrotreating/dewaxing temperatures of about 200° C. to about 360° C., e.g., about 200° C. to about 350° C., about 200° C. to about 340° C., about 200° C. to about 370° C., about 250° C. to about 360° C., about 250° C. to about 350° C., about 250° C. to about 340° C., about 250° C. to about 370° C., about 300° C. to about 360° C., about 300° C. to about 350° C., about 300° C. to about 340° C., or about 300° ° C. to about 370° C.

In some aspects, additional benefit in maintaining desirable yield can be achieved by using a ZSM-11 catalyst (and/or other catalyst including an MEL framework molecular sieve) with a reduced ratio of molecular sieve to binder at higher temperatures, such as at least about 370° C., at least about 380° C., or at least about 400° C. or more. In such aspects, the ratio (by weight) of molecular sieve to binder can be about 1.0 or less, e.g., about 0.8 or less or about 0.6 or less. Optionally, the binder can include or be alumina. As the temperature is increased during a hydrotreating run, a dewaxing catalyst with a reduced/minimized content of molecular sieve can allow for cloud point improvement while advantageously also reducing/minimizing the amount of excess cracking of the feed. In combination with typical end-of-run temperatures, the additional benefit in cloud point reduction/yield maintenance can be achieved for hydrotreating/dewaxing temperatures of about 370° C. to about 450° ° C., e.g., about 370° C. to about 425° C., about 370° C. to about 400° C., about 380° C. to about 450° C., about 380° C. to about 425° C., about 400'° C. to about 450° C., or about 400° ° C. to about 425° C.

In other aspects, a catalyst including an MEL framework molecular sieve can be an alumina-bound catalyst with a ratio (by weight) of molecular sieve to binder of at least about 1.2, e.g., at least about 2.0, at least about 4.0, or at least about 4.5. This can provide a catalyst with increased dewaxing activity.

In some aspects, a catalyst including an MEL framework molecular sieve can have an Alpha value of at least about 350, e.g., at least about 370, at least about 400, at least about 430, or at least about 450. The alpha value test is a measure of the cracking activity of a catalyst and is described in U.S. Pat. No. 3,354,078 and in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of ~538° C. and a variable flow rate as described in detail in the Journal of Catalysis, Vol. 61, p. 395.

In some aspects, a catalyst including an MEL framework molecular sieve can have a molar ratio of silica to alumina of about 35 to 55, e.g., about 40 to 50.

In some aspects, a catalyst including an MEL framework molecular sieve can have a total surface area (micropore plus external) of at least about 350 $m^2/g$ prior to incorporation of a hydrogenation metal on the catalyst, such as at least about 370 $m^2/g$ or at least about 400 $m^2/g$.

In some aspects, the hydrotreated effluent can include at least some organically bound sulfur removed during exposure to the dewaxing catalyst. In such aspects, the hydrotreated effluent can include at least about 50 wppm of sulfur in the form of organic sulfur compounds, such as at least about 100 wppm or at least about 250 wppm. In other aspects, the hydrotreated effluent can include less than about 50 wppm of sulfur in the form of organic sulfur compounds, such as less than about 25 wppm or less than about 10 wppm.

In some aspects, hydrotreatment of the feed prior to dewaxing can produce a hydrotreated effluent with a reduced content of organically-bound sulfur, but with an increased volume of $H_2S$ in the gas phase to which the dewaxing catalyst is exposed. In such aspects, the hydrotreated effluent can be exposed to the dewaxing catalyst under conditions including at least about 0.1 vol % of $H_2S$ relative to the volume of hydrogen treat gas, e.g., at least about 0.2 vol %.

For reaction system configurations where a diesel boiling range product is produced, based in part on exposure of a feed to a dewaxing catalyst, the diesel boiling range product can have a cloud point of about −10° C. or less, e.g., about −20° C. or less, about −30° C. or less, or about −40° C. or less. Additionally or alternately, the diesel boiling range product can have a sulfur content of about 100 wppm or less, e.g., about 50 wppm or less, about 35 wppm or less, about 25 wppm or less, about 20 wppm or less, about 15 wppm or less, or about 10 wppm or less. Additionally or alternately, the diesel boiling range product can have a nitrogen content of about 100 wppm or less, e.g., about 50 wppm or less, about 35 wppm or less, about 25 wppm or less, about 20 wppm or less, about 15 wppm or less, or about 10 wppm or less.

Examples of Reaction Systems for Hydroprocessing

In the discussion herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst. For convenience in description, even though the two catalysts may be stacked together in a single catalyst bed, the hydrocracking catalyst and dewaxing catalyst can each be referred to conceptually as separate catalyst beds.

In the discussion herein, reference is made to a hydroprocessing reaction system. The hydroprocessing reaction system can correspond to the one or more stages, such as two stages/reactors and an optional intermediate separator, used to expose a feed to a plurality of catalysts under hydroprocessing conditions. The plurality of catalysts can be distributed between the stages/reactors in any convenient manner, with some preferred methods of arranging the catalyst described herein.

Various types of hydroprocessing can be used in the production of distillate fuels and/or lubricant base oils. In some aspects, diesel boiling range fuel products can be formed by exposing a diesel and/or distillate boiling range feed to hydrotreating catalyst and a ZSM-11 (and/or other MEL framework structure) dewaxing catalyst under effective hydrotreating conditions. Optionally, the hydrotreating catalyst and the ZSM-11 dewaxing catalyst can be located in the same reactor. Optionally, the hydrotreating catalyst and the ZSM-11 dewaxing catalyst can be located within the same catalyst bed in a reactor. Optionally, the effluent (or at least a portion thereof) from exposing the feed to the hydrotreating catalyst and the dewaxing catalyst can be exposed to an aromatic saturation catalyst. This type of configuration can allow for production of a diesel boiling range product with reduced sulfur content, reduced nitrogen content, and/or improved cold flow properties.

In other aspects, diesel boiling range fuel products can be formed by exposing a diesel and/or distillate boiling range feed to hydrotreating catalyst under effective hydrotreating conditions and a ZSM-11 (and/or other MEL framework structure) dewaxing catalyst under effective dewaxing conditions. Optionally, the hydrotreating catalyst and the ZSM-11 dewaxing catalyst can be located in the same reactor. Optionally, the effluent (or at least a portion thereof) from exposing the feed to the hydrotreating catalyst and the dewaxing catalyst can be exposed to an aromatic saturation catalyst. This type of configuration can allow for production of a diesel boiling range product with reduced sulfur content, reduced nitrogen content, and/or improved cold flow properties.

In still other aspects, diesel boiling range products and lubricant boiling range products can be formed by exposing a lubricant and/or distillate boiling range feed to hydrotreating catalyst under effective hydrotreating conditions; hydrocracking catalyst under effective hydrocracking conditions; and a ZSM-11 (and/or other MEL framework structure) dewaxing catalyst under effective dewaxing conditions. Optionally, a separation can be performed on hydrotreated effluent and/or hydrocracked effluent prior to at least one additional stage of hydrotreatment and/or hydrocracking. This separation can correspond to a separation to remove light ends ($C_{4-}$), or this separation can also allow for separation of any fuels boiling range material formed during the exposure to the hydrotreating and/or hydrocracking catalyst(s). Optionally, a separation can be performed on hydrotreated effluent and/or hydrocracked effluent prior to at least one stage of catalytic dewaxing. This separation can correspond to a separation to remove light ends ($C_{4-}$), and/or this separation can allow for separation of any fuels boiling range material formed during the exposure to the hydrotreating and/or hydrocracking catalyst(s). Optionally, the effluent (or at least a portion thereof) from exposing the feed to the dewaxing catalyst can be exposed to an aromatic saturation catalyst. This type of configuration can allow for production of diesel boiling range product and/or lubricant boiling range product with reduced sulfur content, reduced nitrogen content, and/or improved cold flow properties.

Figure 8:
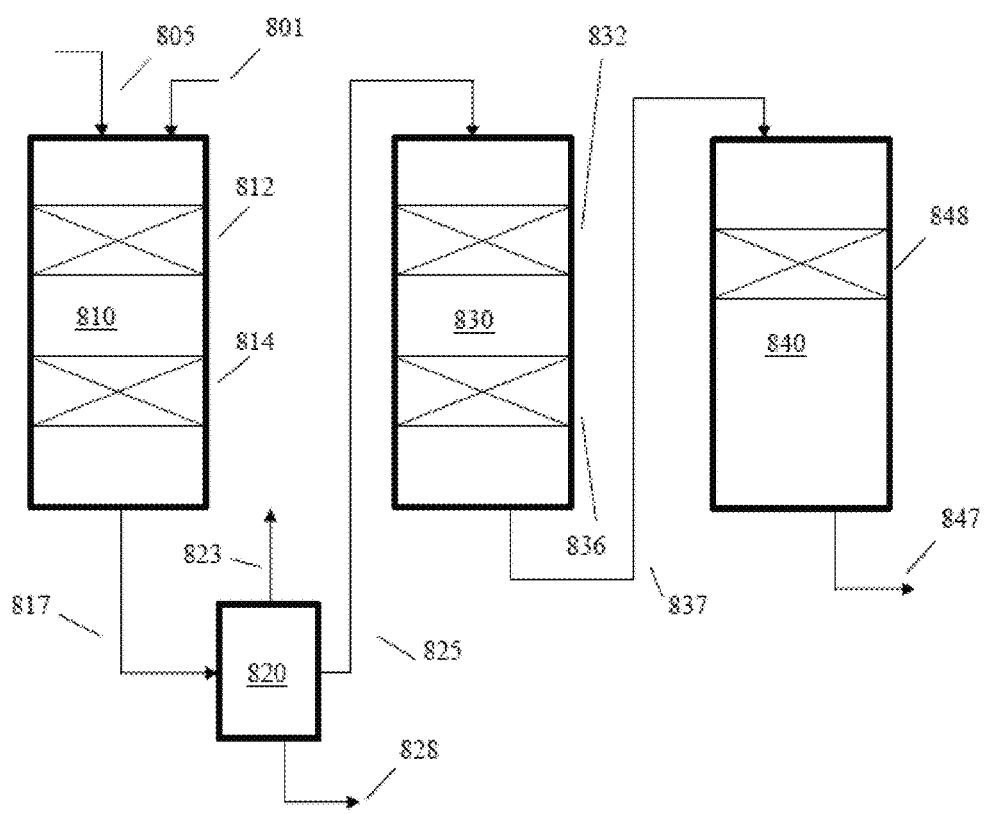
FIG. 8 shows an example of a configuration for hydroprocessing of a distillate boiling range feed.

FIG. 8 shows an example of a reaction system for hydroprocessing of a feed for fuels and/or lubricant base oil production. In the example shown in FIG. 8, a suitable feed 805 can be introduced into a first reactor (or reactors) 810. Hydrogen can be introduced at one or more various locations within the reaction system, such as hydrogen-containing stream 801. Reactor 810 is schematically shown as including at least one bed 812 of hydrotreating catalyst and at least one bed 814 of hydrocracking catalyst. Either hydrotreating catalyst bed(s) 812 or hydrocracking bed(s) 814 can be optional. After exposing the feed to the hydrotreating and/or hydrocracking catalyst under effective conditions, the resulting first effluent 817 can be passed into a separator 820. In some aspects, separator 820 can be a gas-liquid type separator for removing contaminant gases 823 generated during hydrotreatment and/or hydrocracking, such as $H_2S$ and/or $NH_3$. This can allow subsequent stages or catalyst beds in the reaction system to operate as "sweet" reaction stages. In other aspects, separator 820 can allow for separation of liquid hydrocarbon products 828 from the effluent below a desired cut point. For example, for a system for lubricant base oil production, separator 820 can allow for separation of diesel and/or naphtha boiling range compounds, optionally as one or more separate streams, such as one or more diesel streams, one or more kerosene or jet streams, and/or one or more naphtha streams. As another example, for a system for diesel fuel production, separator 820 might separate out diesel and lower boiling range compounds, or separator 820 may separate out naphtha boiling range compounds while retaining diesel with the primary process flow.

After passing through separator 820, the remaining portion 825 of the effluent can be passed into one or more second reactors 830. In the example shown in FIG. 8, reactor 830 can include at least one (optional) bed 832 of a hydrotreating and/or hydrocracking catalyst and at least one bed 836 of a dewaxing catalyst. The dewaxing catalyst bed 836 can include at least a portion of a ZSM-11 catalyst, as described herein. The resulting dewaxed effluent 837 can then be passed into one or more third reactors 840 for exposure to at least one (optional) bed 848 of hydrofinishing and/or aromatic saturation catalyst. The dewaxed effluent 837 and/or the hydrofinished effluent 847 can be fractionated (not shown) in order to form one or more product streams, such as lubricant base oils, distillate fuel fractions, and/or naphtha fuel fractions.

In some alternative aspects, a reaction system for fuels production can include fewer reactors/stages than the system shown in FIG. 8. For example, for hydrotreatment and dewaxing of a diesel boiling range feed and/or distillate boiling range feed for production of diesel boiling range products, just reactor 810 could be used. In such an example, a suitable feed 805 can be introduced into one or more first reactors 810. Hydrogen can be introduced at one or more various locations within the reaction system, such as hydrogen-containing stream 801. In this type of example, reactor 810 could include at least one bed 812 of hydrotreating catalyst and at least one bed 814 of ZSM-11 (or other MEL framework structure) dewaxing catalyst. Alternatively, just bed(s) 812 could be included, with ZSM-11 dewaxing catalyst being included in the beds along with the hydrotreating catalyst.

Hydrotreatment Conditions

Hydrotreatment can typically be used to reduce the sulfur, nitrogen, and aromatic content of a feed. The catalysts used for hydrotreatment can include conventional hydroprocessing catalysts, for example those that comprise at least one Group VIII non-noble metal (Columns 8-10 of IUPAC periodic table), such as Fe, Co, and/or Ni, for instance at least Co and/or Ni; and at least one Group VI metal (Column 6 of IUPAC periodic table), such as Mo and/or W. Such hydroprocessing catalysts can optionally include transition metal sulfides impregnated or dispersed on a refractory support/carrier such as alumina and/or silica. The support/carrier itself can typically have little or no significant/measurable catalytic activity. Substantially carrier- or support-free catalysts, commonly referred to as bulk catalysts, can generally have higher volumetric activities than their supported counterparts.

The catalysts can either be in bulk form or in supported form. In addition to alumina and/or silica, other suitable support/carrier materials can include, but are not limited to, zeolites, titania, silica-titania, and titania-alumina. Suitable aluminas can include porous aluminas, such as gamma and/or eta, having average pore sizes from 50 to 200 Å, e.g., from 75 to 150 Å, a surface area from 100 to 300 m$^2$/g, e.g., from 150 to 250 m$^2$/g, and a pore volume from 0.25 to 1.0 cm$^3$/g, e.g., 0.35 to 0.8 cm$^3$/g. More generally, any convenient size, shape, and/or pore size distribution for a catalyst suitable for hydrotreatment of a distillate (including lubricant base oil) boiling range feed in a conventional manner may be used. It is noted that more than one type of hydroprocessing catalyst can be used in one or multiple reaction vessels.

The at least one Group VIII non-noble metal, in oxide form, can be present in an amount ranging from 2 wt % to 40 wt %, e.g., from 4 wt % to 15 wt %. The at least one Group VI metal, as measured in oxide form, can be present in an amount ranging from 2 wt % to 70 wt %, or, for supported catalysts, from 6 wt % to 40 wt % or from 10 wt % to 30 wt %, based on the total weight of the catalyst. Suitable metal catalysts can include Co/Mo (~1-10% Co as oxide, ~10-40% Mo as oxide), Ni/Mo (~1-10% Ni as oxide, ~10-40% Co as oxide), or Ni/W (~1-10% Ni as oxide, ~10-40% W as oxide), for example on alumina, silica, silica-alumina, and/or titania.

The hydrotreatment can advantageously be carried out in the presence of hydrogen. A hydrogen stream can, therefore, be fed or injected into a vessel/reaction zone/hydroprocessing zone where hydroprocessing catalyst is located. Hydrogen, contained in a hydrogen "treat gas," can be provided to the reaction zone. Treat gas can be either pure hydrogen or a hydrogen-containing gas, including hydrogen in an amount sufficient for the intended reaction(s), optionally including one or more other gases (e.g., nitrogen and/or light hydrocarbons such as methane), which should ideally not adversely interfere with/affect either the reactions or the products. Impurities, such as H$_2$S and NH$_3$, can be undesirable and can typically be removed from the treat gas before it is conducted to the reactor. In aspects where the treat gas stream introduced into a reaction stage contains components other than hydrogen, the treat gas can contain at least 50 vol % H$_2$, e.g., at least 75 vol %, at least 90 vol %, at least 95 vol %, or at least 99 vol %.

Hydrogen can be supplied at a rate from 100 SCF/B (standard cubic feet of hydrogen per barrel of feed) (~17 Nm$^3$/m$^3$) to 1500 SCF/B (~250 Nm$^3$/m$^3$). In certain embodiments, the hydrogen can be provided in a range from 200 SCF/B (~34 Nm$^3$/m$^3$) to 1200 SCF/B (~200 Nm$^3$/m$^3$), Hydrogen can be supplied co-currently with the input feed to the hydrotreatment reactor/reaction zone and/or separately via a separate gas conduit to the hydrotreatment zone.

Hydrotreating conditions can include temperatures of 200° C. to 450° C., such as 315° C. to 425° C., pressures of 250 psig (~1.8 MPag) to 5000 psig (~35 MPag), such as 300 psig (~2.1 MPag) to 3000 psig (~20.9 MPag), liquid hourly space velocities (LHSV) of 0.1 hr$^{-1}$ to 10 hr$^{-1}$, and hydrogen treat rates of 200 scf/B (~34 Nm$^3$/m$^3$) to 10000 scf/B (~1700 Nm$^3$/m$^3$), such as 500 scf/B (~85 Nm$^3$/m$^3$) to 10000 scf/B (~1700 Nm$^3$/m$^3$).

Hydrocracking Conditions

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system used to hydroprocess the lower boiling portion of the feed from the vacuum distillation unit. Suitable amounts of conversion of molecules boiling above 700° F. to molecules boiling below 700° F. can include converting at least 25% of the 700° F.+ portion of the feedstock in the stage(s) of the reaction system, e.g., at least 40%, at least 50%, at least 60%, at least 70%, or at least 75%. Additionally or alternately, the amount of conversion for the reaction system can be 85% or less, e.g., 80% or less, 75% or less, 70% or less, 60% or less, or 50% or less. Each of the above lower bounds on the amount of conversion is explicitly contemplated in conjunction with each of the above upper bounds. Still larger amounts of conversion may also produce a suitable hydrocracker bottoms for forming lubricant base oils, but such higher conversion amounts can also typically result in a reduced yield of lubricant base oils. Reducing the amount of conversion can increase the yield of lubricant base oils, but reducing the amount of conversion too far, e.g., below the ranges noted above, may result in hydrocracker bottoms unsuitable for formation of Group II, Group II+, or Group III lubricant base oils.

In order to achieve a desired level of conversion, a reaction system can include at least one hydrocracking catalyst. Hydrocracking catalysts can typically contain sulfided base metals on acidic supports, such as amorphous silica alumina, cracking zeolites such as USY, and/or acidified alumina. Often these acidic supports can be mixed or bound with other metal oxides such as alumina, titania, and/or silica. Examples of suitable acidic supports can include acidic molecular sieves, such as zeolites or silicoaluminophosphates. One example of suitable zeolite is USY, such as a USY zeolite with cell size of ~24.25 Angstroms or less. Additionally or alternately, the catalyst can be a low acidity molecular sieve, such as a USY zeolite with an Si to Al ratio of at least 20, such as at least 40 or at least 50. Zeolite Beta is another example of a potentially suitable hydrocracking catalyst. Non-limiting examples of metals for hydrocracking catalysts can include metals or combinations of metals that include at least one Group VIII metal, such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can be used. Non-limiting examples of noble metal catalysts can include those based on platinum and/or palladium. Support materials that may be useful for both the noble and non-noble metal catalysts can comprise a refractory oxide material such as alumina, silica, alumina-silica, kieselguhr, diatomaceous earth, magnesia, zirconia, or combinations thereof, with alumina, silica, and/or alumina-silica being the most common (and preferred, in one embodiment).

In various aspects, the conditions selected for hydrocracking for fuels production and/or lubricant base stock production can depend on the desired level of conversion, the level of contaminants in the input feed to a hydrocracking stage, and potentially other factors. For example, hydrocracking conditions in a first stage (such as a sour stage) and/or a second stage (such as a sweet stage) can be selected to achieve a desired level of conversion in the reaction system. A hydrocracking process in the first stage (or otherwise under sour conditions) can be carried out at temperatures of 550° F. (288° C.) to 840° F. (449° C.), hydrogen partial pressures of 250 psig to 5000 psig (~1.8 MPag to ~35 MPag), liquid hourly space velocities of 0.05 $h^{-1}$ to 10 $h^{-1}$, and hydrogen treat gas rates of 35 $Nm^3/m^3$ to 1700 $Nm^3/m^3$ (~200 SCF/B to ~10000 SCF/B). In other embodiments, the conditions can include temperatures in the range of 600° F. (343° C.) to 815° F. (435° C.), hydrogen partial pressures of 500 psig to 3000 psig (~3.5 MPag to ~20.9 MPag), and hydrogen treat gas rates of 200 $Nm^3/m^3$ to 1020 $Nm^3/m^3$ (~1200 SCF/B to ~6000 SCF/B). The LHSV relative to only the hydrocracking catalyst can be from 0.25 $h^{-1}$ to 50 $h^{-1}$, such as from 0.5 $h^{-1}$ to 20 $h^{-1}$ or from 1.0 $h^{-1}$ to 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator can be to simply perform a gas-liquid separation to remove contaminant. Another option can be to use a separator, such as a flash separator, that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can be removed, thus reducing the volume of effluent processed in the second and/or other subsequent stages. Of course, any low boiling contaminants in the effluent from the first stage could additionally or alternatively be separated into the portion boiling below the temperature cut point. If sufficient contaminant removal is performed in the first stage, the second stage can be operated as a "sweet" or low contaminant stage.

An additional or alternative option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction can include naphtha boiling range molecules, light ends, and contaminants such as $H_2S$. These different products can be separated from each other in any convenient manner, if desired. Similarly, one or more distillate fuel fractions can be formed, if desired, from the distillate boiling range fraction. The portion boiling above the distillate fuel range represents potential lubricant base oils. In such aspects, the portion boiling above the distillate fuel range can be subjected to further hydroprocessing in a second hydroprocessing stage.

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be at least 40° F. (22° C.) less than the temperature for a hydrocracking process in the first stage, e.g., at least 80° F. (44° C.) less or at least 120° F. (66° C.) less, optionally not more than 200° F. (110° C.) less. The pressure for a hydrocracking process in a second stage can be at least 100 psig (700 kPag) less than a hydrocracking process in the first stage, e.g., at least 200 psig (1.4 MPag) less or at least 300 psig (2.1 MPag) less, optionally not more than 1000 psig (6.9 MPag) less. Additionally or alternatively, suitable hydrocracking conditions for a second (non-sour) stage can include, but are not limited to, conditions similar to a first or sour stage. Suitable hydrocracking conditions can include temperatures of 550° F. (288° C.) to 840° F. (449° C.), hydrogen partial pressures of 250 psig to 5000 psig (1.8 MPag to 35 MPag), liquid hourly space velocities of 0.05 $h^{-1}$ to 10 $h^{-1}$, and hydrogen treat gas rates of from 34 $Nm^3/m^3$ to 1700 $Nm^3/m^3$ (~200 SCF/B to ~10000 SCF/B). In other embodiments, the conditions can include temperatures in the range of 600° F. (343° C.) to 815° F. (435° C.), hydrogen partial pressures of 500 psig to 3000 psig (3.5 MPag-20.9 MPag), and hydrogen treat gas rates of 200 $Nm^3/m^3$ to 1020 $Nm^3/m^3$ (~1200 SCF/B to ~6000 SCF/B). The liquid hourly space velocity can vary depending on the relative amount of hydrocracking catalyst used versus dewaxing catalyst. Relative to the combined amount of hydrocracking and dewaxing catalyst, the LHSV can be from 0.2 $h^{-1}$ to 10 $h^{-1}$, such as from 0.5 $h^{-1}$ to 5 $h^{-1}$ and/or from 1 $h^{-1}$ to 4 $h^{-1}$. Depending on the relative amount of hydrocracking catalyst and dewaxing catalyst used, the LHSV relative to only the hydrocracking catalyst can be from 0.25 $h^{-1}$ to 50 $h^{-1}$, such as from 0.5 $h^{-1}$ to 20 $h^{-1}$ or from 1.0 $h^{-1}$ to 4.0 $h^{-1}$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Catalytic Dewaxing Process

In some aspects, ZSM-11 dewaxing catalyst (and/or other MEL framework structure dewaxing catalyst) can be included in the same stage and/or the same reactor and/or the same bed as hydrotreating catalyst. The ZSM-11 dewaxing catalyst can be mixed with the hydrotreating catalyst and/or the ZSM-11 dewaxing catalyst can be downstream (within the same bed or in a different bed) relative to at least a portion of the hydrotreating catalyst or relative to substantially all of the hydrotreating catalyst.

In other aspects, ZSM-11 dewaxing catalyst can be located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst. In still other aspects, dewaxing catalyst can be used in a catalyst bed prior to (i.e., upstream relative to the process flow) at least one bed of hydrotreating and/or hydrocracking catalyst.

In various aspects, at least a portion of the dewaxing catalyst can correspond to a ZSM-11 dewaxing catalyst as described herein. Such a dewaxing catalyst can be used alone, or in conjunction with one or more other additional dewaxing catalysts.

Additional suitable dewaxing catalysts can include molecular sieves such as crystalline aluminosilicates (e.g., zeolites). In an embodiment, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves selective for dewaxing by isomerization as opposed to cracking can be used, such as ZSM-48, zeolite Beta, ZSM-23, or a combination thereof. Additionally or alternatively, the molecular sieve can comprise, consist essentially of, or be a 10-member ring 1-D molecular sieve. Examples can include EU-1, ZSM-35 (or ferrierite), ZSM-11, ZSM-57, NU-87, SAPO-11, ZSM-48, ZSM-23, and/or ZSM-22: for example EU-2, EU-11, ZBM-30, ZSM-48, and/or ZSM-23; such as including at least ZSM-48. Note that a zeolite having the ZSM-23 structure with a silica to alumina ratio from ~20:1 to ~40:1 can sometimes be referred to as SSZ-32. Other molecular sieves isostructural with the above materials can include NU-10, EU-13, KZ-1, and/or NU-23. Optionally, the additional dewaxing catalyst(s) can include a binder for the molecular sieve, such as alumina, titania, silica, silica-alumina, zirconia, or a combination thereof, for example alumina and/or titania or silica and/or zirconia and/or titania.

In some aspects, the additional dewaxing catalyst(s) used in processes according to the invention can be catalysts with a low ratio of silica to alumina. For example, for ZSM-48, the ratio of silica to alumina in the zeolite can be less than 200:1, such as less than 150:1, less than 110:1, less than 100:1, less than 90:1, or less than 75:1. In various embodiments, the ratio of silica to alumina can be from 50:1 to 200:1, such as from 60:1 to 160:1, from 60:1 to 130:1, from 60:1 to 110:1, from 70:1 to 130:1, from 70:1 to 110:1, or from 70:1 to 100:1.

In various aspects, the additional dewaxing catalyst(s) can further include a metal hydrogenation component. The metal hydrogenation component can typically be a Group VI and/or a Group VIII metal, such as a Group VIII noble metal. For example, the metal hydrogenation component can be Pt and/or Pd. In an alternative aspect, the metal hydrogenation component can be a combination of a non-noble Group VIII metal with a Group VI metal. Suitable combinations can include Ni, Co, and/or Fe with Mo and/or W, particularly Ni with Mo and/or W.

The metal hydrogenation component may be added to an additional catalyst in any convenient manner. One technique for adding the metal hydrogenation component can be by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor can be added to a mixture of zeolite (or of zeolite and binder) prior to extrusion.

The amount of metal in an additional dewaxing catalyst can be at least 0.1 wt % based on catalyst weight, e.g., at least 0.15 wt %, at least 0.2 wt %, at least 0.25 wt %, at least 0.3 wt %, or at least 0.5 wt %. The amount of metal in the catalyst can additionally or alternatively be 20 wt % or less based on catalyst weight, e.g., 10 wt % or less, 5 wt % or less, 2.5 wt % or less, or 1 wt % or less. For aspects where the metal is Pt, Pd, another Group VIII noble metal, or a combination thereof, the amount of metal can be from 0.1 to 5 wt %, e.g., from 0.1 to 2 wt %, from 0.25 to 1.8 wt %, or from 0.4 to 1.5 wt %. For embodiments where the metal is a combination of a non-noble Group VIII metal with a Group VI metal, the combined amount of metal can be from 0.5 wt % to 20 wt %, e.g., from 1 wt % to 15 wt % or from 2.5 wt % to 10 wt %.

The additional dewaxing catalysts useful in processes according to the invention can also include a binder. In some aspects, the dewaxing catalysts can be formulated using a low surface area binder, a low surface area binder represents a binder with a surface area of 100 m$^2$/g or less, e.g., 80 m$^2$/g or less or 70 m$^2$/g or less. The amount of zeolite in a catalyst formulated using a binder can be from 30 wt % zeolite to 90 wt % zeolite, relative to the combined weight of binder and zeolite. In many embodiments, the amount of zeolite can be at least 50 wt % of the combined weight of zeolite and binder, such as at least 60 wt % or from 65 wt % to 80 wt %. Optionally, the dewaxing catalyst can include a binder for the molecular sieve, such as alumina, titania, silica, silica-alumina, zirconia, or a combination thereof. In certain embodiments, the binder can include or be alumina. In another embodiment, the binder can include or be alumina and/or titania. In still another embodiment, the binder can include or be titania, silica, zirconia, or a combination thereof.

A zeolite (or zeolitic molecular sieve) can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion agents/aids can also be used to modify the extrusion flow properties of the zeolite and binder mixture.

Process conditions in a catalytic dewaxing zone can include a temperature of 200° C. to 450° C., e.g., 270° C. to 400° C., a hydrogen partial pressure of 1.8 MPag to 35 MPag (250 psig to 5000 psig), e.g., 4.9 MPag to 20.9 MPag, and a hydrogen treat gas rate of 34 Nm$^3$/m$^3$ (~200 SCF/B) to 1700 Nm$^3$/m$^3$ (~10000 scf/B), e.g., 170 Nm$^3$/m$^3$ (~1000

SCF/B) to 850 Nm$^3$/m$^3$ (~5000 SCF/B). In still other embodiments, the conditions can include temperatures in the range of 600° F. (343° C.) to 815° F. (435° C.), hydrogen partial pressures of 500 psig to 3000 psig (3.5 MPag to 20.9 MPag), and hydrogen treat gas rates of 200 Nm$^3$/m$^3$ to 1020 Nm$^3$/m$^3$ (~1200 SCF/B to ~6000 SCF/B). These latter conditions may be suitable, for example, if the dewaxing stage is operating under sour conditions. The liquid hourly space velocity (LHSV) can be from 0.2 h$^{-1}$ to 10 h$^{-1}$, such as from 0.5 h$^{-1}$ to 5 h$^{-1}$ and/or from 1 h$^{-1}$ to 4 h$^{-1}$.

The catalytic dewaxing may be performed at low pressure conditions such as less than 800 psig of H2 pressure, such as between 150 psig and 800 psig and a hydrogen treat gas rate of 34 Nm$^3$/m$^3$ (~200 SCF/B) to 1700 Nm$^3$/m$^3$ (~10000 scf/B), e.g., 170 Nm$^3$/m$^3$ (~1000 SCF/B) to 850 Nm$^3$/m$^3$ (~5000 SCF/B), and a temperature of 200° C. to 450° C., e.g., 270° C. to 400° C. The liquid hourly space velocity (LHSV) can be from 0.2 h$^{-1}$ to 10 h$^{-1}$, such as from 0.5 h$^{-1}$ to 5 h$^{-1}$ and/or from 1 h$^{-1}$ to 4 h$^{-1}$. These conditions may be particularly well-suited for dewaxing a hydrotreated stream having a relatively higher amount of organic nitrogen slip, such as about 10 wppm to about 100 wppm organic nitrogen, e.g., 10 wppm to 30 wppm organic nitrogen. Nevertheless, such dewaxing may be performed at organic nitrogen slip as low as 0 wppm, such as for example an organic nitrogen slip between 0 wppm and 100 wppm. Furthermore, catalyst dewaxing may also be performed at pressures up to 3000 psig, such as between 150 psig to 3000 psig.

Additionally or alternately, the conditions for dewaxing can be selected based on the conditions for a preceding reaction in the stage, such as hydrocracking conditions and/or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed at least 10° F. (6° C.) lower than the prior catalyst bed, e.g., at least 20° F. (11° C.) lower, at least 30° F. (16° C.) lower, or at least 40° F. (21° C.) lower, optionally up to 150° F. (90° C.) lower.

As still another option, the dewaxing catalyst in the final reaction stage can be mixed with another type of catalyst, such as hydrotreating catalyst, in at least one bed in a reactor. As yet another option, a hydrocracking catalyst and a dewaxing catalyst can be co-extruded with a single binder to form a mixed functionality catalyst.

Hydrofinishing and/or Aromatic Saturation Process

In some aspects, a hydrofinishing and/or aromatic saturation stage can also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occur(s) after fractionation, the hydrofinishing can be performed on one or more portions of the fractionated product, such as the bottoms from the reaction stage (e.g., hydrocracker bottoms). Alternatively, the entire effluent from the last hydrocracking and/or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process can be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group VI metals, Group VIII metals, and mixtures thereof. In an embodiment, the metals can include at least one metal sulfide having a strong hydrogenation function. In another embodiment, the hydrofinishing catalyst can include a Group VIII noble metal, such as Pt and/or Pd. The mixture of metals may be present as bulk metal catalysts where the amount of metal can be 30 wt % or greater, based on catalyst weight. Suitable metal oxide supports can include low acidic oxides such as silica, alumina, silica-aluminas, and/or titania, particularly at least including alumina. Advantageous hydrofinishing catalysts for aromatic saturation can comprise at least one metal having relatively strong hydrogenation function on a porous support. Typical support materials can include amorphous and/or crystalline oxide materials such as alumina, silica, or silica-alumina. The support materials may be modified, such as by halogenation, or, in particular, fluorination. The metal content of the catalyst can often be as high as 20 wt % for non-noble metals. In an embodiment, a hydrofinishing catalyst can include a crystalline material belonging to the M41S class or family of catalysts, which are mesoporous materials typically having high silica content. Examples include MCM-41, MCM-48, and MCM-50, particularly MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and/or polynuclear aromatic content reduction.

Hydrofinishing conditions can include temperatures from 125° C. to 425° C., such as 180° C. to 280° C., a hydrogen partial pressure from 500 psig (3.5 MPag) to 3000 psig (20.9 MPag), such as 1500 psig (~10.5 MPa) to 2500 psig (~17.5 MPa), and liquid hourly space velocity from 0.1 hr$^{-1}$ to 5 hr$^{-1}$ LHSV, such as 0.5 hr$^{-1}$ to 2.0 hr$^{-1}$. Additionally, a hydrogen treat gas rate from 34 Nm$^3$/m$^3$ to 1700 Nm$^3$/m$^3$ (~200 SCF/B to ~10000 SCF/B) can be used.

After hydroprocessing, the bottoms from the hydroprocessing reaction system can have a viscosity index (VI) of at least 95, such as at least 105 or at least 110. The amount of saturated molecules in the bottoms from the hydroprocessing reaction system can be at least 90%, while the sulfur content of the bottoms can be less than 300 wppm. Thus, the bottoms from the hydroprocessing reaction system can be suitable for use as a Group II, Group II+, or Group III lubricant base oil.

Other Embodiments

Additionally or alternately, the present invention can include one or more of the following embodiments.

Embodiment 1. A method for treating a distillate boiling range feed, comprising: exposing a distillate boiling range feed to a hydrotreating catalyst under effective hydrotreating conditions to form a hydrotreated effluent; and exposing at least a portion of the hydrotreated effluent having an organic nitrogen content of about 10 to about 100 wppm nitrogen, such as about 10 wppm to about 60 wppm organic nitrogen, to a dewaxing catalyst under effective dewaxing conditions to form a dewaxed effluent comprising a diesel boiling range product, the dewaxing catalyst comprising one or more hydrogenation metals supported on an (optionally bound) molecular sieve having a MEL framework structure, the molecular sieve optionally comprising ZSM-11, the dewaxing conditions including an H2 pressure of about 800 psig or less.

Embodiment 2. A method for treating a distillate boiling range feed, comprising: exposing a distillate boiling range feed to a hydrotreating catalyst and a dewaxing catalyst under effective hydroprocessing conditions to form a hydroprocessed effluent comprising a diesel boiling range product, the dewaxing catalyst comprising one or more hydrogenation metals supported on an (optionally bound) molecular sieve having a MEL framework structure, the molecular sieve optionally comprising ZSM-11, the hydrotreating catalyst and the dewaxing catalyst optionally comprising a stacked bed of catalyst, a mixed bed of catalyst, or a combination thereof.

Embodiment 3. The method of any of the above embodiments, wherein the dewaxing catalyst further comprises a binder, the binder optionally comprising alumina, the dewaxing catalyst (as bound) optionally having an external surface area of 250 m$^2$/g or less, e.g., 200 m$^2$/g or less or 150 m$^2$/g or less.

Embodiment 4. A method for treating a distillate boiling range feed, comprising: exposing a distillate boiling range feed to a hydrotreating catalyst under effective hydroprocessing conditions to form a hydrotreated effluent; and exposing at least a portion of the hydrotreated effluent to a dewaxing catalyst under the effective hydroprocessing conditions to form a dewaxed effluent comprising a diesel boiling range product, the dewaxing catalyst comprising one or more hydrogenation metals supported on a bound molecular sieve having a MEL framework structure, the dewaxing catalyst having a ratio of molecular sieve to binder by weight of about 1.0 or less, the effective hydroprocessing conditions comprise a temperature of at least about 370° C.

Embodiment 5. A method for treating a distillate boiling range feed, comprising: exposing a distillate boiling range feed to a hydrotreating catalyst under effective hydroprocessing conditions to form a hydrotreated effluent; and exposing at least a portion of the hydrotreated effluent to a dewaxing catalyst under the effective hydroprocessing conditions to form a dewaxed effluent comprising a diesel boiling range product, the dewaxing catalyst comprising one or more hydrogenation metals and a molecular sieve having a MEL framework structure, the effective hydroprocessing conditions comprising a temperature of about 370° C. or less.

Embodiment 6. The method of Embodiment 3 or 4, wherein the bound catalyst has a ratio of molecular sieve to binder by weight of about 1.0 or less, for example about 0.8 or less or about 0.6 or less, the effective hydroprocessing conditions optionally comprising a temperature of at least about 370° C., such as at least about 380° C. or at least about 400° C.

Embodiment 7. The method of any of Embodiments 1-3 or 5, wherein the dewaxing catalyst has a ratio of molecular sieve to binder by weight of at least about 1.2, e.g., at least about 2.0, at least about 4.0, or at least about 4.5, and/or wherein the effective hydroprocessing conditions comprise a temperature of 370° C. or less, or 360° C. or less, or 350° C. or less.

Embodiment 8. The method of any of the above embodiments, wherein the one or more hydrogenation metals comprise one or more Group 6 metals, one or more Group 8-10 non-noble metals, or a combination thereof, the one or more hydrogenation metals optionally comprising Co and Mo, Ni and Mo, or Ni and W, the dewaxing catalyst optionally comprising about 3 wt % to about 30 wt % of the one or more hydrogenation metals.

Embodiment 9. The method of Embodiment 8, wherein the one or more hydrogenation metals are impregnated using an impregnation solution comprising a dispersion agent, the dispersion agent comprising 2-10 carbon atoms and having a carbon to oxygen ratio of about 0.6 to about 2.

Embodiment 10. The method of Embodiment 8 or 9, wherein the at least a portion of the hydrotreated effluent comprises at least about 50 wppm of sulfur in the form of organic sulfur compounds, such as at least about 100 wppm or at least about 250 wppm.

Embodiment 11. The method of any of Embodiments 1-7, wherein the one or more hydrogenation metals comprise one or more Group 8-10 noble metals, the one or more hydrogenation metals optionally comprising Pt and/or Pd, the dewaxing catalyst optionally comprising 0.1 wt % to 5 wt % of the one or more hydrogenation metals.

Embodiment 12. The method of Embodiment 11, wherein the at least a portion of the hydrotreated effluent comprises about 50 wppm or less of sulfur in the form of organic sulfur compounds, such as about 25 wppm or less or about 10 wppm or less, the effective hydroprocessing conditions optionally comprising at least about 0.1 vol % of $H_2S$ relative to the volume of hydrogen treat gas.

Embodiment 13. The method of any of the above embodiments, wherein the distillate boiling range feed comprises a diesel boiling range feed, wherein the distillate boiling range feed comprises at least about 0.1 wt % sulfur in the form of organic sulfur compounds, or a combination thereof.

Embodiment 14. The method of any of the above embodiments, wherein the at least a portion of the hydrotreated effluent is quenched prior to exposing to the dewaxing catalyst, and/or wherein the at least a portion of the hydrotreated effluent is cascaded to the dewaxing catalyst.

Embodiment 15. A diesel boiling range product formed according to any of the above method embodiments.

Embodiment 16. The method of any of the above embodiments, wherein the $H_2$ pressure is between 150 psig and 800 psig.

Embodiment 17. The method of any of the above embodiments, wherein the organic nitrogen content is between 10 wppm and 30 wppm.

EXAMPLES

In the following examples, the benefit of using ZSM-11 and/or another MEL framework catalysts is shown for production of diesel boiling range products.

Example 1

Preparation of ZSM-11

A mixture was prepared from about 8.25 kg of water, about 1.54 kg of tetra-n-butylammonium bromide (~50% solution) as a structure directing agent or template, about 2.75 kg of Ultrasil™ silica, about 1.01 kg of aluminum sulfate solution (~47%), about 880 g of ~50% sodium hydroxide solution, and about 30 g of ZSM-11 seeds. The mixture had the following molar composition:

TABLE

Example 1

| Reactants | Molar ratio |
|---|---|
| $SiO_2:Al_2O_3$ | ~50.2 |
| $H_2O:SiO_2$ | ~13.9 |
| $OH^-:SiO_2$ | ~0.15 |
| $Na^+/SiO_2$ | ~0.26 |
| template/$SiO_2$ | ~0.06 |

Figure 9:
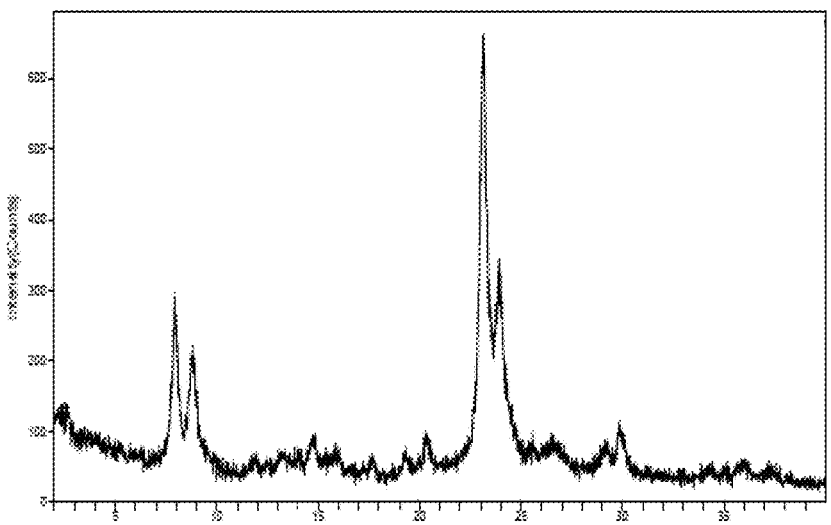
FIG. 9 shows an X-ray diffraction plot of ZSM-11 crystals.
Figure 10:
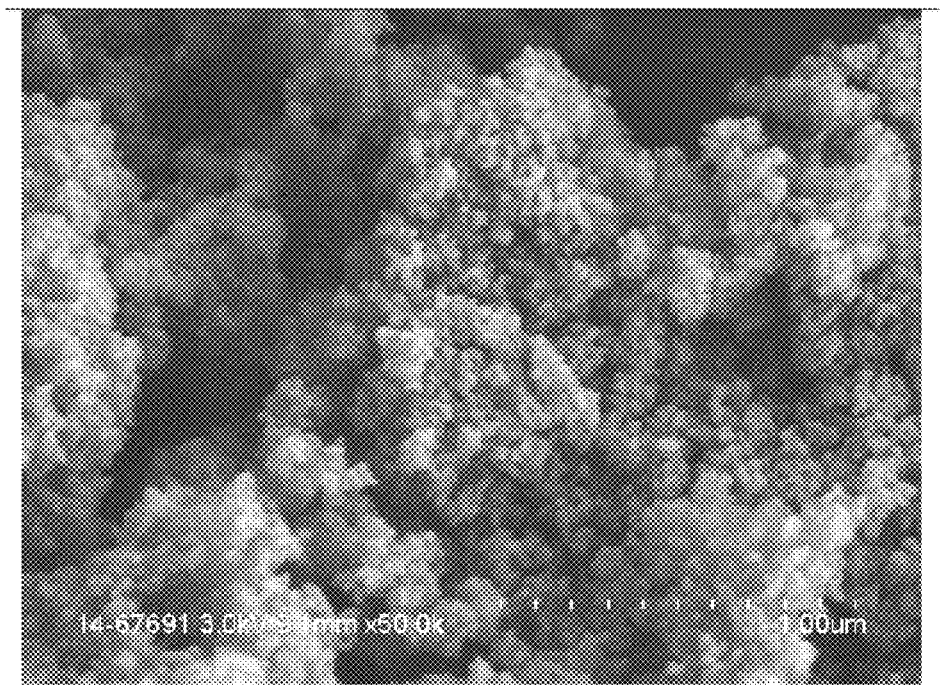
FIG. 10 shows a scanning electron microscopy micrograph of ZSM-11 crystals.

The mixture was reacted at about 250° F. (~121° C.) in a ~5-gal autoclave with stirring at about 350 RPM for ~120 hours. The product was filtered, washed with deionized (DI) water and dried at about 250° F. (~121° C.). The XRD pattern of the as-synthesized material appeared to show typical pure phase ZSM-11 topology, as shown in FIG. 9. The SEM of the as-synthesized material appeared to show morphology of agglomerates composed of small crystallites with size of <0.05 micron, as shown in FIG. 10. The as-synthesized crystals were converted into the hydrogen form by three ion exchanges with ammonium nitrate solution at room temperature (~20-25° C.), followed by drying at about 250° F. (~121° C.) and calcination at about 1000° F. (~538° C.) for ~6 hours. The resulting MA-ZSM-11 crystals had a $SiO_2/Al_2O_3$ molar ratio of ~45, a total surface area (total SA=micropore SA+mesopore SA) of ~481 m²/g (~364 m²/g micropore+~117 m²/g mesopore), hexane sorption of about 96.9 mg/g, and an Alpha value of about 750.

Example 2

Extrusion of Small, Medium Activity ZSM-11 Crystals with Alumina Binders

About 65 parts (basis: calcined ~538° C.) of ZSM-11 crystal with silica/alumina molar ratio of ~45/1 (Example 1) were mixed with about 35 parts of pseudoboehmite alumina (basis: calcined ~538° C.) in a Simpson muller. Sufficient water was added to produce an extrudable paste on a ~2" Bonnot extruder. The mix of ZSM-11, pseudoboehmite alumina, and water containing paste was extruded and dried in a hotpack oven at ~121° C. overnight (~8-16 hours). The dried extrudate was calcined in nitrogen at ~538° C. to decompose and remove the organic template. The $N_2$ calcined extrudate was humidified with saturated air and exchanged with ~1N ammonium nitrate to remove sodium (spec: <500 ppm Na). After ammonium exchange, the extrudate was washed with deionized water to remove residual nitrate ions prior to drying. The ammonium exchanged extrudate was dried at ~121° C. overnight and calcined in air at ~538° C. Several extrusions were made with varying zeolite/binder ratios. Catalyst 2a corresponded to a ~65/~35 ratio of zeolite to alumina described above; catalyst 2b corresponded to a ~50/~50 ratio of zeolite to alumina, and Catalyst 2c corresponded to a ~35/~65 ratio. The Alpha and BET $N_2$ porosity data for these catalysts are summarized in Table 2 below.

TABLE 2

Extruded ZSM-11 catalyst particle properties

| | Alpha value | n-hexane uptake (mg/g) | Micropore surf. area (m²/g) | External surf. area (m²/g) | Pore vol. (cc/g) | Median pore size (nm) |
|---|---|---|---|---|---|---|
| 2a | ~440 | ~73.9 | ~199 | ~220 | ~0.71 | ~9.7 |
| 2b | ~390 | ~64.8 | ~152 | ~244 | ~0.70 | ~8.4 |
| 2c | ~290 | ~55.1 | ~81.5 | ~294 | ~0.75 | ~8.3 |

Example 3

Preparation of Base Metal ZSM-11 and ZSM-48 Catalysts with Dispersion Agents

Extrudates similar to those made in Example 2 were used as supports for base metals. The extrudates included either a higher surface area alumina (Versal™ 300) or a lower surface area alumina (Catapal™ 200 or Catapal™ D) as a binder. The absorption capacity of the extrudates was estimated using deionized water. NiMo and NiW impregnations were performed on extrudates from both Examples 2a and 2b. The Ni, Mo, and W precursor compounds used in the catalyst preparations were nickel carbonate hydroxide tetrahydrate, ammonium heptamolybdate tetrahydrate, and ammonium metatungstate hydrate, respectively. The dispersion aid used in the impregnations was chosen as either citric acid, nitrilotriacetic acid (NTA), gluconic acid (GA), or ethylene glycol. The volume of the impregnation solution was targeted as ~95% of the absorption capacity of the extrudates. To avoid damaging the extrudates during impregnation, the extrudates were humidified with air bubbling through a water bath at room temperature for ~16 hours.

As an example, for Example 3a, the absorption capacity of the extrudate was measured as ~0.60 ml/g. About 5.38 g of citric acid was dissolved in ~8.0 g of deionized water. About 1.65 g of nickel carbonate hydroxide tetrahydrate was slowly added into the citric acid solution, followed by the addition of ~6.26 g of ammonium heptamolybdate tetrahydrate. These amounts yielded a solution with Ni:Mo molar ratio of ~0.39 and citric acid/Ni molar ratio of ~2. The total solution volume was adjusted with deionized water to give a volume of ~11.4 mL, and the solution was impregnated onto ~20.0 g of catalyst from Example 2a. After impregnation the catalyst was dried in air at ~121° C. for ~16 hours. It is noted that a subsequent calcination was not performed after drying Table 3 lists the ZSM-11 catalysts prepared with dispersion aids. Similarly, ZSM-48 containing catalysts were prepared and impregnated with base metals using the dispersion aids. Table 3 also lists the ZSM-48 catalysts demonstrated and tested in the course of this work.

In Table 3, "V300" was used to refer to the higher surface area alumina binder, while "C200" was used to refer to the lower surface area binder. For catalyst 3x, the catalyst was both dried at ~121° C. and calcined at a temperature above ~350° C. after impregnation with a solution containing an Ni salt, W salt, and acetate precursor.

TABLE 3

Catalyst Compositions

3a - 3.4 wt % Ni/14 wt % Mo/citric acid/(65/35) ZSM-11 (46:1 $SiO_2:Al_2O_3$)/V300

TABLE 3-continued

Catalyst Compositions

3b - 3.4 wt % Ni/14 wt % Mo/citric acid/(50/50) ZSM-11 (46:1 SiO$_2$:Al$_2$O$_3$)/V300
3c - 3.4 wt % Ni/14 wt % Mo/citric acid/(35/65) ZSM-11 (46:1 SiO$_2$:Al$_2$O$_3$)/V300
3d - 2.9 wt % Ni/8.8 wt % Mo/citric acid/(65/35) ZSM-11 (46:1 SiO$_2$:Al$_2$O$_3$)/V300
3e - 3.3 wt % Ni/5.7 wt % Mo/citric acid/(65/35) ZSM-11 (46:1 SiO$_2$:Al$_2$O$_3$)/V300
3g - 3.3 wt % Ni/5.7 wt % Mo/citric acid/(65/35) ZSM-11 (46:1 SiO$_2$:Al$_2$O$_3$)/C200
3h - 3.3 wt % Ni/5.7 wt % Mo/nitrilotriacetic acid/(65/35) ZSM-11 (46:1 SiO$_2$:Al$_2$O$_3$)/V300
3i - 3.2 wt % Ni/10.9 wt % W/citric acid/(65/35) ZSM-11 (46:1 SiO$_2$:Al$_2$O$_3$)/C200
3j - 3.2 wt % Ni/10.9 wt % W/citric acid/(65/35) ZSM-11 (46:1 SiO$_2$:Al$_2$O$_3$)/V300
3k - 3.4 wt % Ni/14 wt % Mo/citric acid/(65/35) ZSM-48 (70:1 SiO$_2$:Al$_2$O$_3$)/C200
3l - 3.3 wt % Ni/5.7 wt % Mo/citric acid/(65/35) ZSM-48 (70:1 SiO$_2$:Al$_2$O$_3$)/C200
3q - 3 wt % Ni/15.5 wt % Mo/carbonate-citric acid/(65/35) ZSM-48 (70:1 SiO$_2$:Al$_2$O$_3$)/C200
3x - 3 wt % Ni/15.5 wt % W/acetate (calcined)/(65/35) ZSM-48 (70:1 SiO$_2$:Al$_2$O$_3$)/C200
3y - 3 wt % Ni/15.5 wt % W/ethylene glycol/(65/35) ZSM-48 (70:1 SiO$_2$:Al$_2$O$_3$)/C200
3z - 3 wt % Ni/15.5 wt % W/citric acid/(65/35) ZSM-48 (70:1 SiO$_2$:Al$_2$O$_3$)/C200

Example 4

Preparation of Base Metal Catalysts with Dispersion Agents Supported on Al$_2$O$_3$ (Comparative)

Using impregnation methods described in Example 3, two base metal catalysts were prepared by impregnating a solution of base metal precursors, dispersion agent, and water onto extrudates composed of ~100% Al$_2$O$_3$. The alumina extrudates corresponded to extrudates suitable for use as a catalyst support for a hydrotreating catalyst. These two catalysts are summarized in Table 4.

TABLE 4

Impregnation with dispersion agent on amorphous alumina

4a - 3.4 wt % Ni/14 wt % Mo/citric acid/Al$_2$O$_3$
4b - 2.9 wt % Ni/8.8 wt % Mo/citric acid/Al$_2$O$_3$ Example 5

Distillate Dewaxing Evaluation of Base Metal Dewaxing Catalysts

The effect of zeolite content was tested on ZSM-11 bound with Versal™ 300 alumina. It is anticipated that similar effect would be achieved with other types of binders and zeolites. For the hydrotreating function, the base metals content chosen was ~3.4 wt % Ni and ~14 wt % Mo, impregnated using citric acid as a dispersion agent. The catalysts tested were Catalysts 3a, 3b, and 3c. As a reference, alumina only support, impregnated with the same metals content (~3.4 wt % Ni+~14 wt % Mo) and using the same method, was tested in parallel (Catalyst 4a). Another reference was a ZSM-48 catalyst with a slightly different loading of Ni and Mo (Catalyst 3d).

The catalysts were evaluated for sour service hydrotreating/dewaxing (hydroisomerization) of a diesel range feed at ~2 hr$^{-1}$ LHSV, ~1000 psig, ~2250 SCFB hydrogen treat rate, and at temperatures between ~338° C. and ~393° C. The feed used in this study is shown in Table 5 below. The catalysts were sized and loaded into the reactor as ~14/20 mesh particles. The reactor was placed in a sand bath to ensure isothermal operation. After loading the catalyst were dried down and sulfided as follows: The catalyst was dried for ~2 hours under flowing N$_2$ at ~110° C. and ~600 psig, followed by a ~2 hour hold under H$_2$ at ~110° C. and ~600 psig. Following this dry down, catalyst wetting was performed at ~110° C. and ~1000 psig with a light gas oil and ~2000 SCFB H$_2$, followed by heating the reactor up to ~204° C. at which point feed was switched to a spiked light gas oil flowing at ~2.0 hr$^{-1}$ LHSV containing ~2.5 wt % S (spiking performed with DMDS to reach achieved S level) while maintaining H$_2$ flow at ~2250 SCFB. After introducing the spiked light gas oil, the reactor was heated to ~250° C. at a ramp rate of ~28° C./hr under the same liquid and gas flow rates and held for a minimum of 8 hours before ramping to ~321° C. at ~28° C./hr and performing a final hold of ~5 hours. After this final hold at ~321° C. was complete, the diesel feed in Table 5 was introduced to the reactor, and the reactor temperature was increased to the first experimental condition.

TABLE 5

| | |
|---|---|
| 5% off (wt % D2887) | 215 (° C.) |
| 10% off | 249 |
| 20% off | 282 |
| 30% off | 311 |
| 40% off | 335 |
| 50% off | 356 |
| 60% off | 369 |
| 70% off | 380 |
| 80% off | 393 |
| 90% off | 410 |
| Final | 456 |
| API Gravity | 28.7 |
| Sulfur (wt %) | 1.03 |
| Nitrogen (wppm) | 460 |
| Cloud point (D5573) | 13° C. |

The dewaxing performance of the catalysts was evaluated by plotting cloud point reduction versus bed temperature and product yields versus cloud point reduction. Cloud point reduction is defined as the difference between feed cloud point and product cloud point. Feed and product cloud points were measured using ASTM D5773. Product cloud points were measured on the total liquid product (TLP) from the reactor. Product yields were calculated by closing material balances and using the simulated distillation (ASTM D2887) results of feed and product to determine yields. The diesel fraction of the feed and product was defined as the fraction boiling between ~177° C. and ~371° C.

Figure 2:
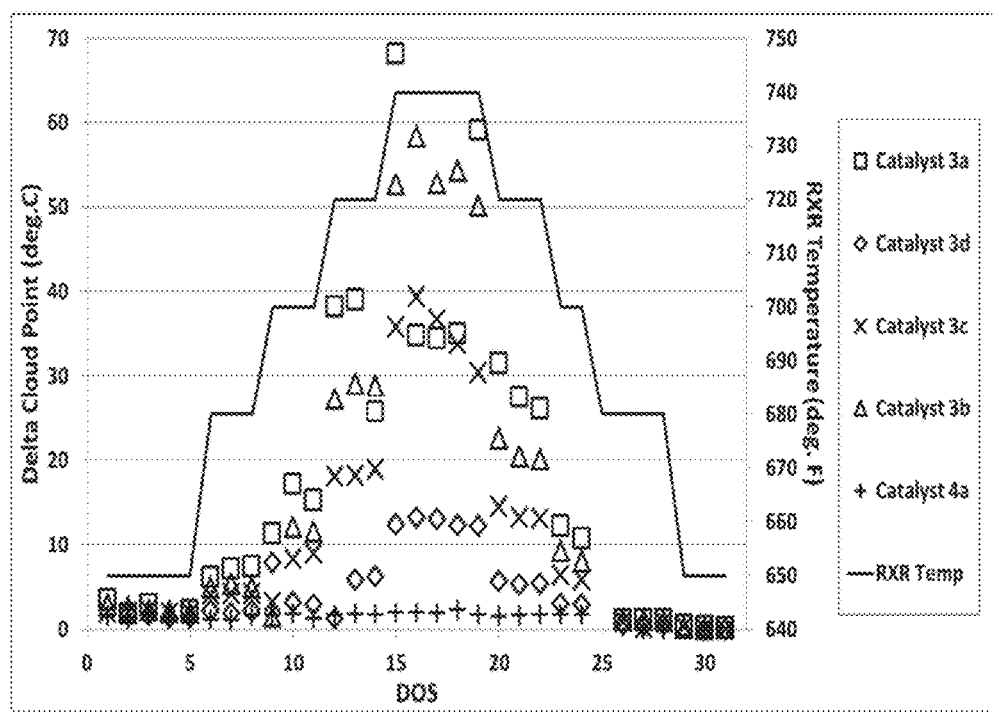
FIG. 2 shows results from processing a distillate feed over dewaxing catalysts with various ratios of molecular sieve to binder.

In FIGS. 1-2, the solid line shows the temperature profile (right axis) used during the processing of the feed. The symbols show the cloud point reduction (left axis) for the diesel boiling range product relative to the feed.

FIGS. 1 and 2 show cloud point reduction data for various ZSM-11 catalysts. FIG. 1 is a larger scale view of the same data shown in FIG. 2. Catalysts 3a, 3b, and 3c correspond to a series of ZSM-11 catalysts with increasing zeolite loading. Catalyst 3d corresponds to a ZSM-48 reference catalyst, while catalyst 4a corresponds to a reference catalyst having base metals on an amorphous hydrotreating catalyst support. The results shown in FIGS. 1 and 2 are also summarized in Table 6 below. A comparison of Catalysts 3a, 3b, and 3c appears to show increasing cloud point reduction with increasing zeolite content. As shown in FIGS. 1 and 2 and in Table 6, Catalysts 3a, 3b, and 3c appear to provide an improvement in cloud point reduction at all temperatures relative to the comparative hydrotreating and ZSM-48 catalysts. This improvement appeared to be increasingly larger as the reaction temperature was increased.

TABLE 6

| Catalyst | ΔCP at Temp. (° C.) | | | | |
|---|---|---|---|---|---|
| | ~650° F. | ~680° F. | ~700° F. | ~720° F. | ~740° F. |
| 4a | ~1.5-2 | ~1.5-2 | ~1.5-2 | ~1.5-2 | ~1.5-2 |
| 3d | ~1.5-2 | ~2-2.5 | ~3 | ~6 | ~13 |
| 3c | ~2-2.5 | ~4 | ~5-10 | ~14-18 | ~30-40 |
| 3b | ~2-3 | ~5 | ~8-12 | ~20-30 | ~50-60 |
| 3a | ~2-4 | ~6-8 | ~10-20 | ~25-40 | >~60 |

Example 6

Distillate Hydrotreating Evaluation of ZSM-11 Catalysts

The catalysts used to generate the cloud point data in Example 5 were sized and loaded into a reactor as ~14/20 mesh particles. The reactor was placed in a sand bath to approximate isothermal operation. The same feed shown in Table 5 was used. After loading, the catalysts were dried for ~2 hours under flowing $N_2$ at ~110° C. and ~600 psig, followed by a ~2 hour hold under $H_2$ at ~110° C. and ~600 psig. Following drying, the catalyst wetting was performed at ~110° C. and ~1000 psig with a light gas oil and ~2250 SCF/B $H_2$, followed by heating the reactor up to ~204° C. at which point feed was switched to a spiked light gas oil flowing at ~2.0 LHSV containing ~2.5 wt % S (spiking performed with DMDS to reach achieved S level) while maintaining $H_2$ flow at ~2250 SCFB. After introducing the spiked light gas oil, the reactor was heated to ~250° C. at a ramp rate of ~28° C./hr under the same liquid and gas flow rates and held for a minimum of 8 hours before ramping to ~321° C. at ~28° C./hr and performing a final hold of ~5 hours. After this final hold at ~321° C. was complete, the spiked diesel feed was introduced to the reactor and the reactor temperature was increased to the first experimental condition at ~343° C.

Figure 3:
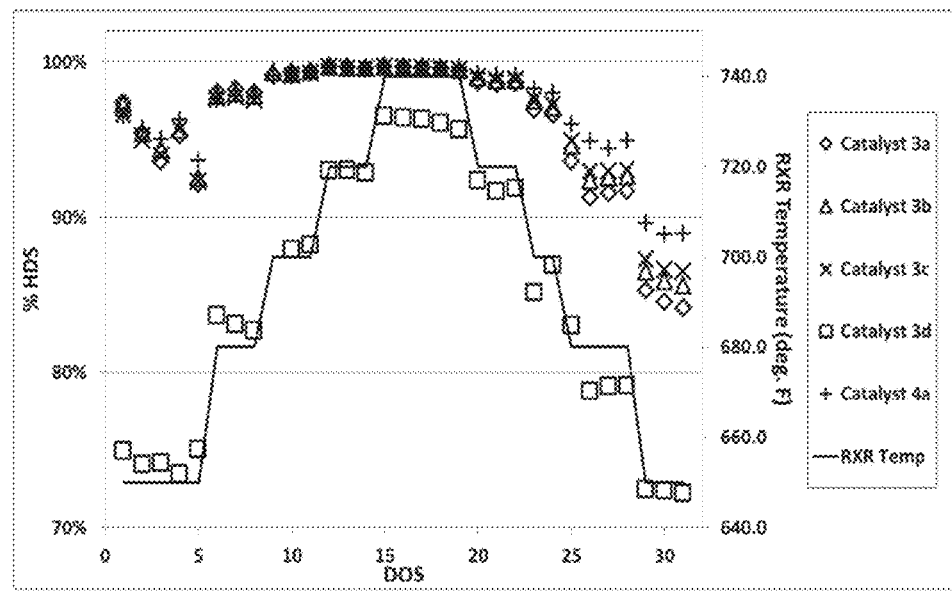
FIG. 3 shows results from processing a distillate feed over dewaxing catalysts with various ratios of molecular sieve to binder.
Figure 4:
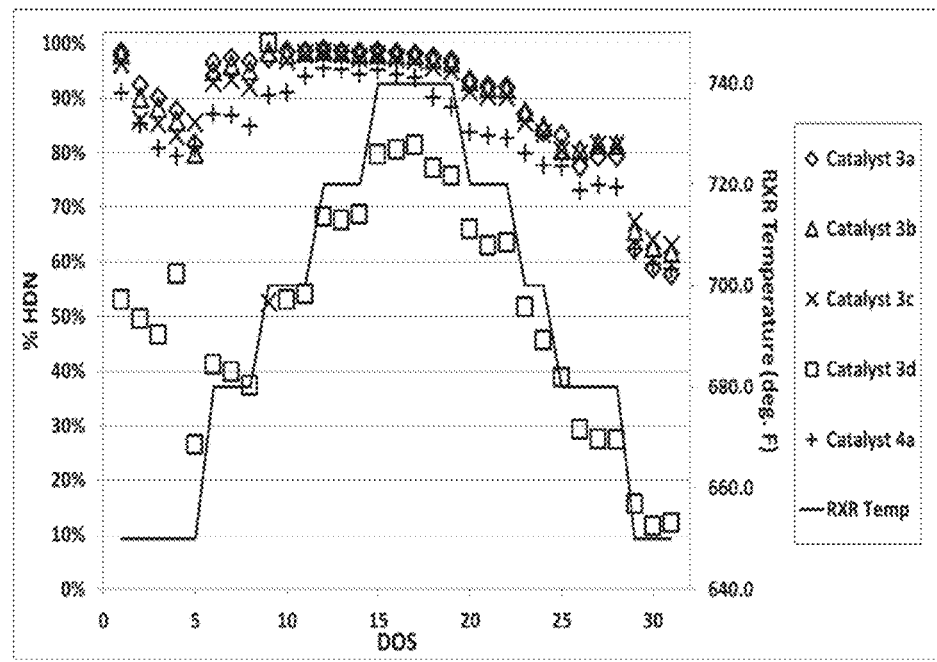
FIG. 4 shows results from processing a distillate feed over dewaxing catalysts with various ratios of molecular sieve to binder.

The hydrotreating functions of the dewaxing catalysts were evaluated by calculating the percentage of organic sulfur and nitrogen removed by the catalyst. Organic sulfur and nitrogen measurements were made by stripping the TLP of $H_2S$ and $NH_3$, and then the organic sulfur and nitrogen concentrations were measured. These are referred to as % HDS and % HDN, respectively. The hydrodesulfurization (HDS) results are shown in FIG. 3, while the hydrodenitrogenation (HDN) results are shown in FIG. 4. The results in FIGS. 3 and 4 appear to show that the ZSM-11 catalysts (3a, 3b, 3c) had HDS and HDN activity comparable to the comparative base metals on an amorphous hydrotreating support. Catalysts 3a, 3b, and 3c also appeared to exhibit higher activity than the reference ZSM-48 catalyst (3d).

Figure 5:
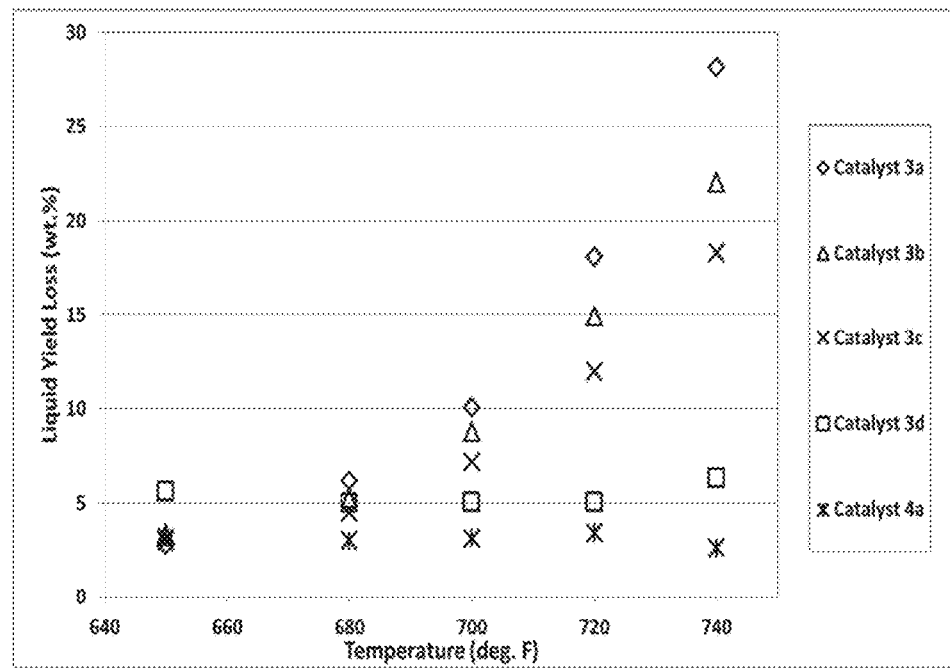
FIG. 5 shows diesel boiling range yields from processing a distillate feed over a variety of dewaxing catalysts.

The yield of diesel boiling range products generated during HDS was also characterized. The liquid yield loss is shown in FIG. 5. As shown in FIG. 5, at temperatures below ~700° F., the ZSM-11 catalysts (3a, 3b, and 3c) appeared to have similar yield losses to the ZSM-48 catalyst (3d) and to the hydrotreating catalyst (4a). This appears to show that a cloud point benefit for dewaxed diesel boiling range products can be achieved with minimal additional yield loss by using a ZSM-11 catalyst. Unexpectedly, this cloud point benefit can be achieved while maintaining a comparable level of HDS and HDN activity relative to a hydrotreating catalyst.

Example 7

Noble Metal Impregnated Catalysts

The extrudates prepared in Examples 2a, 2d, 2e, and 2f were each loaded with ~0.6 wt % Pt by incipient wetness impregnation using platinum tetraamine nitrate. Following impregnation, each catalyst was dried at ~120° C. and calcined in air at ~360° C. for ~3 hours, resulting in Catalysts 7a, 7d, 7e, and 7f. Pt dispersions were calculated from strongly bound $H_2$ measured by $H_2$ chemisorption. The calculated Pt dispersions were as follows: 7a≈0.79; 7d≈0.65; 7e≈0.72; and 7f≈0.61.

Several additional noble metal dewaxing catalysts were also prepared as comparative examples for the Pt-ZSM-11 catalysts. These comparative catalysts included ~0.6 wt % Pt on ~65/~35 steamed (~5.5 hrs @~470° C.) ZSM-5 (~60:1 $SiO_2$:$Al_2O_3$) with $Al_2O_3$ [Example 7g], ~0.6 wt % Pt on ~65/~35 steamed (~10.5 hrs @~540° C.) Beta (~35:1 $SiO_2$:$Al_2O_3$) with $Al_2O_3$ [Example 7h], and ~0.6% Pt on ~65/~35 steamed (~3 hrs @ ~370° C.) ZSM-48 (~70:1 $SiO_2$:$Al_2O_3$) with $Al_2O_3$ [Example 7i]. These three comparative catalysts were all extruded, exchanged, calcined, and impregnated with Pt in a similar manner to the ZSM-11 examples above.

Prior to testing the catalysts of Examples 3 and 4 for distillate dewaxing, the catalysts were sized and loaded into the reactor as ~14/20 mesh particles. The reactor was placed in a sand bath to approximate isothermal operation. The formulated dewaxing catalysts were evaluated for sour service dewaxing (hydroisomerization) of a diesel range feed at ~2 LHSV (over the dewaxing catalyst), ~1000 psig, ~2000 SCFB hydrogen treat rate, and at temperatures between ~338° C. and ~393° C. A commercially available NiMo/$Al_2O_3$ hydrotreating catalyst was loaded upstream of the dewaxing catalyst to decompose the dimethyldisulfide (DMDS) and tertbutylamine (TBA) spiking agents added to the feed as described below. The NiMo hydrotreating catalyst was loaded at ~3.0 LHSV. The diesel feed used in this study was a clean (ULSD) diesel product, the properties of which are summarized in Table 7 below, spiked with DMDS and TBA to obtain atomic sulfur and nitrogen concentrations of ~1.5 wt % and ~500 wppm, respectively. Feed spiking was performed to generate $H_2S$ and $NH_3$ over the NiMo hydrotreating catalyst, in order to simulate the sour dewaxing environment of a hydrotreater.

TABLE 7

| 1% off (wt % D2887) | 140 (° C.) |
|---|---|
| 5% off | 183 |
| 10% off | 204 |
| 20% off | 231 |
| 30% off | 253 |
| 40% off | 274 |
| 50% off | 287 |
| 60% off | 303 |
| 70% off | 320 |
| 80% off | 340 |
| 90% off | 362 |
| 95% off | 374 |
| 99% off | 395 |
| API Gravity | 32.5 |
| Sulfur (wppm) | 10 |

TABLE 7-continued

| | |
|---|---|
| Nitrogen (wppm) | 0.2 |
| Cloud point (D5573) | −4.9° C. |

After loading, the catalysts were dried for ~2 hours under flowing $N_2$ at ~110° C. and ~600 psig, followed by a ~2 hour hold under $H_2$ at ~110° C. and ~600 psig. Following drying, the catalyst wetting was performed at ~110° C. and ~000 psig with a light gas oil and ~2000 SCF/B $H_2$, followed by heating the reactor up to ~204° C. at which point feed was switched to a spiked light gas oil flowing at ~2.0 LHSV containing ~2.5 wt % S (spiking performed with DMDS to reach achieved S level) while maintaining $H_2$ flow at ~2000 SCFB. After introducing the spiked light gas oil, the reactor was heated to ~250° C. at a ramp rate of ~28° C./hr under the same liquid and gas flow rates and held for a minimum of 8 hours before ramping to ~321° C. at ~28° C./hr and performing a final hold of ~5 hours. After this final hold at ~321° C. was complete, the spiked diesel feed was introduced to the reactor and the reactor temperature was increased to the first experimental condition at ~343° C.

Figure 6:
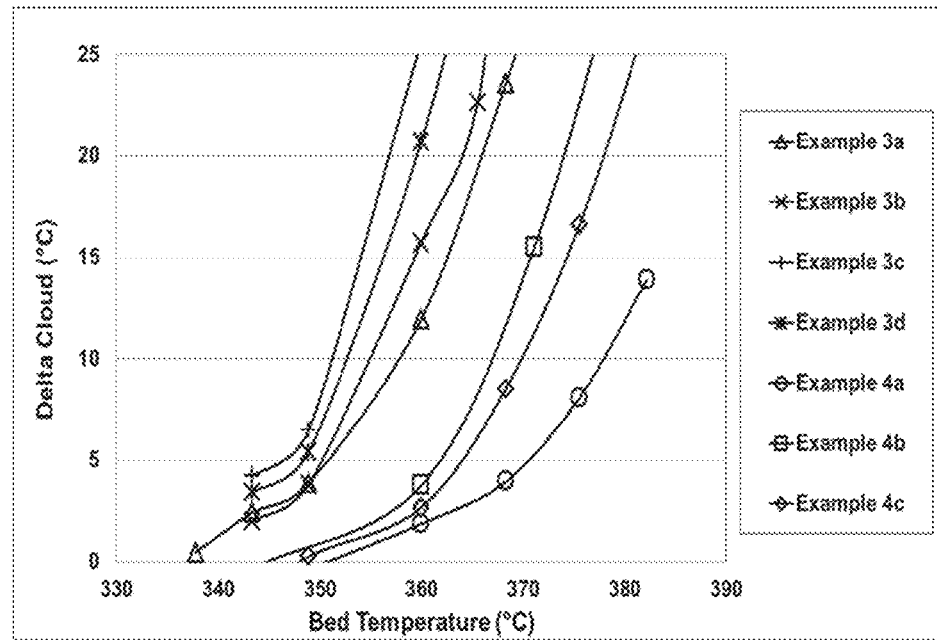
FIG. 6 shows results from processing a distillate feed over a variety of dewaxing catalysts.
Figure 7:
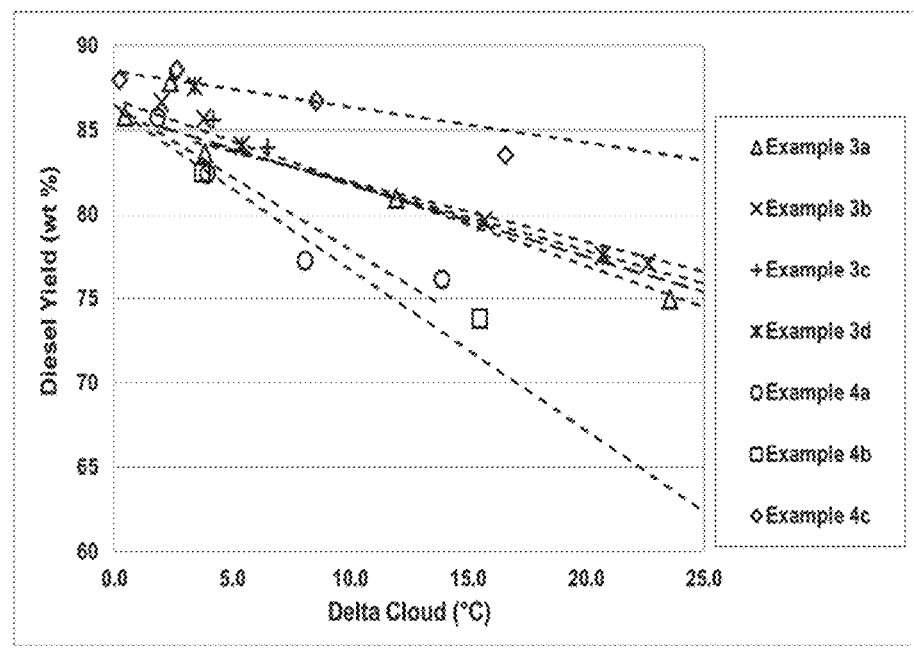
FIG. 7 shows diesel boiling range yields from processing a distillate feed over a variety of dewaxing catalysts.

The dewaxing performances of the catalysts were evaluated by plotting cloud point reduction versus bed temperature and product yields versus cloud point reduction. Cloud point reduction (ΔCP) is defined as the difference between feed cloud point and product cloud point. Feed and product cloud points were measured using ASTM method D5773. Product cloud points were measured on the total liquid product (TLP) from the reactor. Product yields were calculated by closing material balances and using the simulated distillation (D2887) results of feed and product to determine yields. The diesel fraction of the feed and product was approximated as the fraction boiling between 177° C. and 371° C. FIG. 6 shows the cloud point reduction results for the various Pt catalysts. As shown in FIG. 6, the Pt-ZSM-11 catalysts all appeared to demonstrate significantly higher dewaxing activity than any of the three comparative samples. FIG. 7 shows the diesel yield for the various Pt catalysts. As shown in FIG. 7, the Pt-ZSM-11 catalysts all appeared to demonstrate higher diesel yields than the Pt-ZSM-5 and Pt-Beta comparative samples, while the Pt-ZSM-48 catalyst appeared to demonstrate the highest yield of all the catalysts. However, in trim dewaxing applications, Pt-ZSM-11 diesel yields can be similar to those of Pt-ZSM-48.

Example 8

Base Metal Zsm-11 Catalysts

Using sequential incipient wetness impregnation, ~20 wt % W and ~3 wt % Ni were loaded onto a ~65/~35 steamed (~3 hours @~370° C.) ZSM-48 (~70:1 $SiO_2:Al_2O_3$) extrudate with Catapal™ 200. The W was impregnated first using ammonium metatungstate hydrate. Following this impregnation, the catalyst was dried at ~120° C. and calcined in air at ~482° C. for ~1 hour. After impregnation and calcination of W, the Ni impregnation was performed using nickel nitrate hexahydrate. Following the impregnation of the Ni, the catalyst was dried at ~120° C. and calcined in air at ~482° C. for ~1 more hour. A ~3 wt % Ni/~20 wt % W/ZSM-11 (~46:1 $SiO_2:Al_2O_3$)/Catapal™ 200 catalyst was prepared in the same manner. These catalysts are described in Table 8 below.

TABLE 8

| | |
|---|---|
| 8a - | 3 wt % Ni/20 wt % W/ZSM-48 (70:1 $SiO_2:Al_2O_3$)/Catapal200 |
| 8b - | 3 wt % Ni/20 wt % W/ZSM-11 (46:1 $SiO_2:Al_2O_3$)/Catapal200 |

The dewaxing function of the base metal dewaxing catalysts of Table 8 was evaluated in the same manner as the screening of the noble metal catalysts described in Example 7. The same dry down and sulfiding conditions were used prior to introducing the spiked feed and ramping to the first temperature condition.

Figure 11:
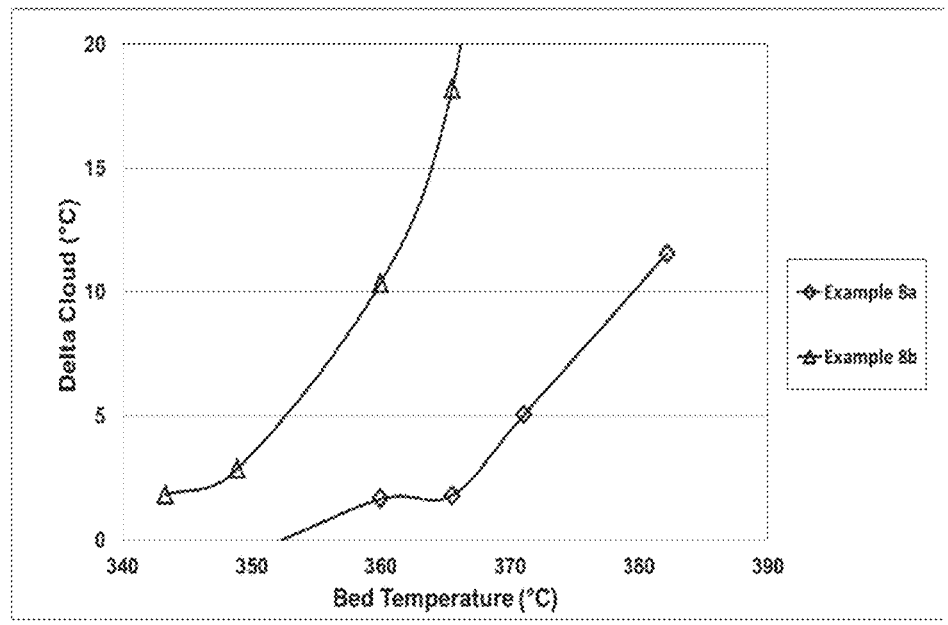
FIG. 11 shows results from processing a distillate feed over a variety of dewaxing catalysts.
Figure 12:
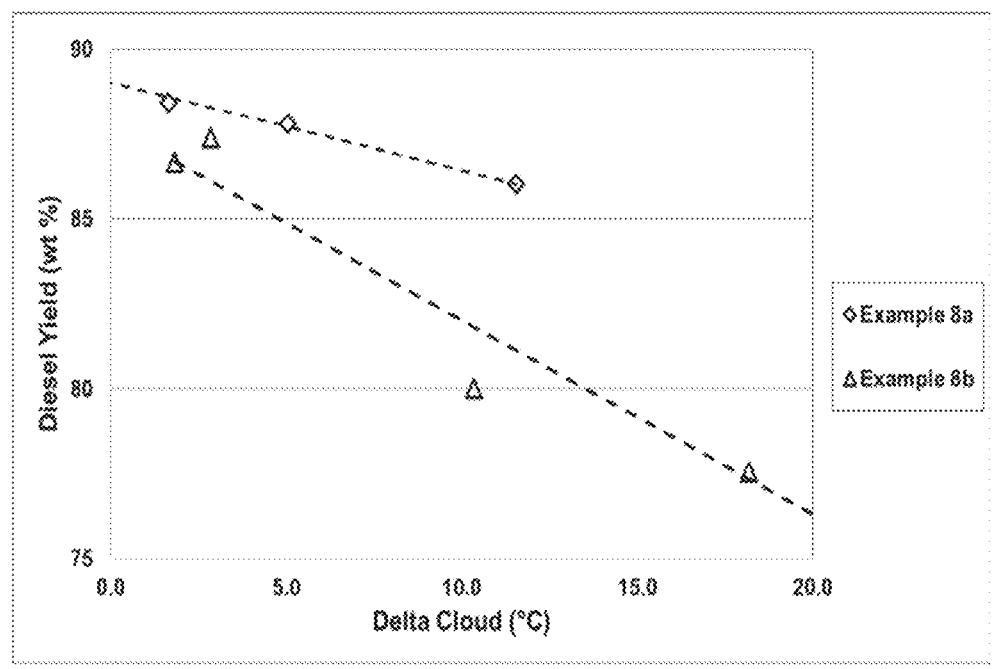
FIG. 12 shows diesel boiling range yields from processing a distillate feed over a variety of dewaxing catalysts.

FIG. 11 shows the cloud point reduction performance of two catalysts prepared by incipient wetness impregnation. As seen in FIG. 11, dewaxing activity of the ZSM-11 catalyst appeared to be significantly higher than the ZSM-48 catalyst. FIG. 12 shows the diesel yield for the catalysts 8a and 8b. As seen in FIG. 12, ZSM-11 (Catalyst 8b) appeared to show similar distillate yield compared to ZSM-48 (Catalyst 8a) for trim dewaxing application (~3-5° C. ΔCP).

Example 9

Hydrotreating and Dewaxing in a Stacked Catalyst System

Catalyst 3a was evaluated in a stacked catalyst configuration with an upstream commercial hydrotreating catalyst for sour service hydrotreating/dewaxing of a diesel range feed at ~0.6 $hr^{-1}$ LHSV over the entire catalyst load, ~2250 SCFB hydrogen treat rate, and at 1300 psig $H_2$ pressure (for high pressure dewaxing) and 800 psig $H_2$ pressure (for low pressure dewaxing). The feed used in this study is shown in Table 5 above. The catalysts were sized and loaded into the reactor as ~14/20 mesh particles. The reactor was placed in a sand bath to ensure isothermal operation. The temperature of each catalyst was controlled independently, thus allowing for tuning of nitrogen and sulfur contents of the feed contacting the dewaxing catalyst. Two catalyst configurations were tested, where the ratio of hydrotreating/dewaxing catalyst volume ratio of either 4:1 or 8:1. Temperature of the hydrotreating catalyst reactor was adjusted to simulate either ultra-low sulfur diesel (10 ppm sulfur and less than 1 ppm nitrogen) for high pressure application or nitrogen slip conditions (20 to 30 ppm nitrogen) to simulate low pressure conditions.

After loading the catalyst were dried down and sulfided as follows: The catalyst was dried for ~2 hours under flowing $N_2$ at ~110° C. and ~600 psig, followed by a ~2 hour hold under $H_2$ at ~110° C. and ~600 psig, Following this dry down, catalyst wetting was performed at ~110° C. and ~1000 psig with a light gas oil and ~2000 SCFB $H_2$, followed by heating the reactor up to ~204° C. at which point feed was switched to a spiked light gas oil flowing at ~2.0 $hr^{-1}$ LHSV containing ~2.5 wt % S (spiking performed with DMDS to reach achieved S level) while maintaining $H_2$ flow at ~2250 SCFB, After introducing the spiked light gas oil, the reactor was heated to ~250° C. at a ramp rate of ~28° C./hr under the same liquid and gas flow rates and held for a minimum of 8 hours before ramping to ~321° C. at ~28° C./hr and performing a final hold of ~5 hours. After this final hold at ~321° C. was complete, the diesel feed in Table 5 was introduced to the reactor, and the reactor temperature was increased to the first experimental condition.

Figure 13:
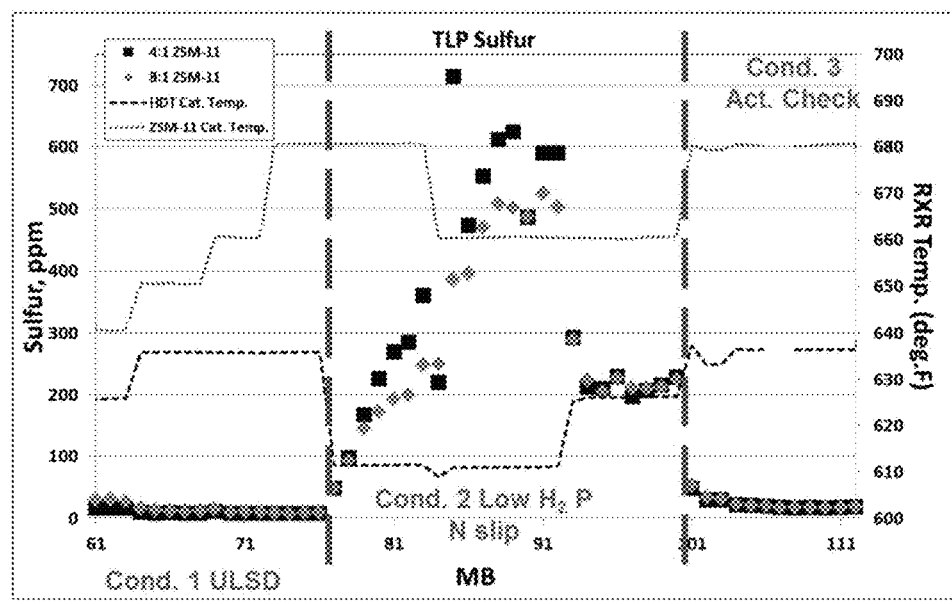
FIG. 13 shows results from processing a distillate feed over a variety of dewaxing conditions.
Figure 14:
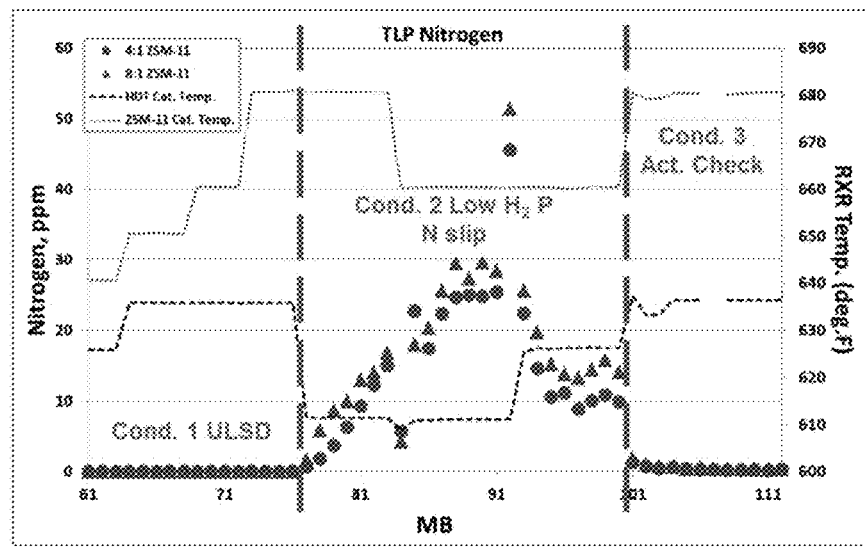
FIG. 14 shows results from processing a distillate feed over a variety of dewaxing conditions.
Figure 15:
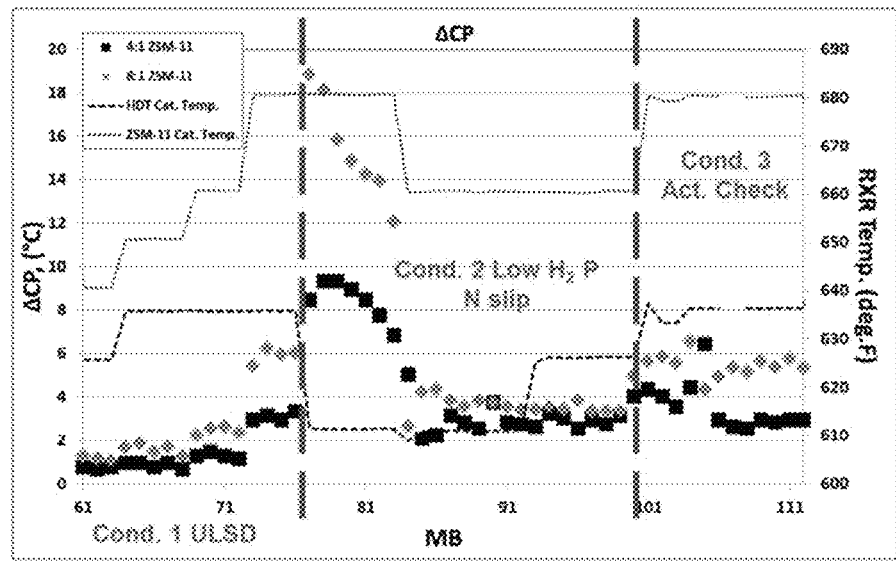
FIG. 15 shows results from processing a distillate feed over a variety of dewaxing conditions.
Figure 16:
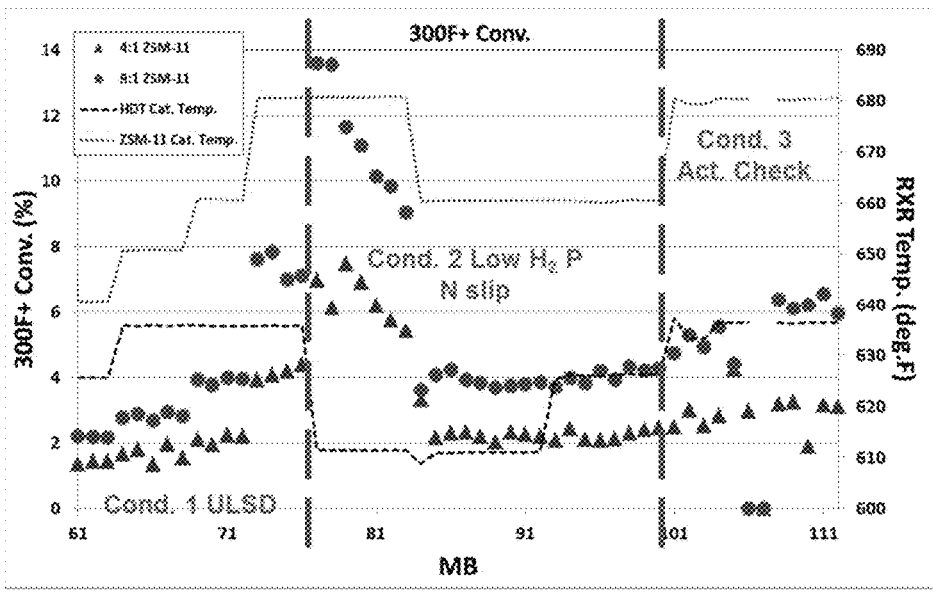
FIG. 16 shows results from processing a distillate feed over a variety of dewaxing conditions.

Dewaxing performance of the catalysts was evaluated by tracking cloud point reduction versus bed temperature. Cloud point reduction is defined as the difference between the feed and product cloud points, each measured in accordance with ASTM method D5773. Product cloud points were measured on the total liquid product from the reactor. The performance was evaluated in three stages with each stage targeting a product having a 3° C. lower cloud point than the feed: (stage 1) conditions targeting ultra-low sulfur diesel product (1,300 psig $H_2$); (stage 2) low pressure and nitrogen slip simulation (10-30 ppm product nitrogen, 800 psig $H_2$); and (stage 3) activity re-check with ultra-low sulfur diesel conditions of stage 1. In each stage, the temperature of the reactors were adjusted to achieve the desired target. FIGS. 13, 14 and 15 show product sulfur, nitrogen, and cloud point reduction, respectively, for each of the stages. FIG. 16 shows 300° F. conversion as calculated from simulated distillation.

As can be seen in the FIGS. 13-16, dewaxing activity significantly increased with decreasing pressure. Remarkably, a cloud point reduction of 3° C. was achieved with nitrogen slip as high as 30 ppm at 800 psig $H_2$ pressure. Such cloud point reduction was also achieved at 20° F. lower temperature with the ZSM-11 catalyst than that which is required at higher presser ultra-low sulfur diesel conditions (e.g., 1300 psig $H_2$ pressure). Such advantages may be achieved at lower conversion and, hence, lower product losses. For example, conversion may be 1-2% less at lower pressure.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for treating a distillate boiling range feed, comprising:
   exposing a distillate boiling range feed to a hydrotreating catalyst under effective hydrotreating conditions to form a hydrotreated effluent; and
   exposing at least a portion of the hydrotreated effluent having an organic nitrogen content of about 10 wppm to about 60 wppm to a dewaxing catalyst under effective dewaxing conditions to form a dewaxed effluent comprising a diesel boiling range product, the dewaxing catalyst comprising one or more hydrogenation metals supported on a bound molecular sieve having a MEL framework structure, the effective dewaxing conditions comprising a $H_2$ pressure of about 800 psig or less;
   wherein the dewaxing catalyst comprises about 3 wt % to about 30 wt % of one or more Group 6 metals, one or more Group 8-10 non-noble metals, or a combination thereof; and
   wherein the one or more hydrogenation metals are impregnated using an impregnation solution comprising a dispersion agent, the dispersion agent comprising 2-10 carbon atoms and having a carbon to oxygen ratio of about 0.6 to about 2.

2. The method of claim 1, wherein the dewaxing catalyst has a ratio of molecular sieve to binder by weight of about 1.0 or less.

3. The method of claim 1, wherein the molecular sieve comprises ZSM-11.

4. The method of claim 1, wherein the $H_2$ pressure is between 150 psig and 800psig.

5. The method of claim 1, wherein the organic nitrogen content is between 10 wppm and 30 wppm.

6. The method of claim 1, wherein the at least a portion of the hydrotreated effluent comprises at least about 100 wppm of sulfur in the form of organic sulfur compounds.

7. The method of claim 1, wherein the dewaxing catalyst comprises about 0.1 wt % to about 5.0 wt % of one or more Group 8-10 noble metals.

8. The method of claim 1, wherein the at least a portion of the hydrotreated effluent comprises about 50 wppm or less of sulfur in the form of organic sulfur compounds.

9. The method of claim 1, wherein the dewaxing catalyst has an external surface area of 250 $m^2/g$ or less.

10. The method of claim 1, wherein the distillate boiling range feed comprises at least about 0.1 wt % sulfur in the form of organic sulfur compounds, or a combination thereof.

11. The method of claim 1, wherein the at least a portion of the hydrotreated effluent is quenched prior to exposing to the dewaxing catalyst.

12. The method of claim 1, wherein the at least a portion of the hydrotreated effluent is cascaded to the dewaxing catalyst.

13. The method of claim 1, wherein the, the molecular sieve has a molar ratio of silica to alumina of about 35 to about 55, the dewaxing catalyst having an alpha value of at least about 380, and the molecular sieve having a total surface area of at least about 350 $m^2/g$.

14. The method of claim 7, wherein the Group 8-10 noble metal comprises Pt and/or Pd.

15. The method of claim 13, wherein the dewaxing catalyst has an alpha value of at least about 400.

16. The method of claim 13, wherein the molecular sieve has a total surface area of at least about 380 $m^2/g$.

17. The method of claim 2, wherein the dewaxing catalyst has a ratio of molecular sieve to binder by weight of about 0.8 or less.

18. The method of claim 1, wherein the dewaxing catalyst has a ratio of molecular sieve to binder by weight of at least about 2.0.

* * * * *